US007502330B2

(12) United States Patent
Nabetani et al.

(10) Patent No.: US 7,502,330 B2
(45) Date of Patent: Mar. 10, 2009

(54) RADIO COMMUNICATION APPARATUS, METHOD AND PROGRAM

(75) Inventors: Toshihisa Nabetani, Kawasaki (JP); Tomoko Adachi, Urayasu (JP); Tomoya Tandai, Tokyo (JP); Katsuya Nonin, Kawasaki (JP); Satoshi Kaburaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 709 days.

(21) Appl. No.: 11/010,627

(22) Filed: Dec. 14, 2004

(65) Prior Publication Data

US 2005/0163058 A1 Jul. 28, 2005

(30) Foreign Application Priority Data

Jan. 26, 2004 (JP) ............................. 2004-017339

(51) Int. Cl.
 *H04L 12/26* (2006.01)
(52) U.S. Cl. ..................... 370/252; 370/347; 455/522
(58) Field of Classification Search ............. 455/452, 455/453, 436, 504; 370/437
See application file for complete search history.

(56) References Cited

U.S. PATENT DOCUMENTS

| 5,008,879 | A | * | 4/1991 | Fischer et al. ............... 370/401 |
| 5,077,732 | A | * | 12/1991 | Fischer et al. ............... 370/437 |
| 5,237,567 | A | * | 8/1993 | Nay et al. ................... 370/438 |
| 5,537,414 | A | * | 7/1996 | Takiyasu et al. ............. 370/347 |
| 6,130,886 | A | * | 10/2000 | Ketseoglou et al. ......... 370/347 |
| 6,498,838 | B1 | * | 12/2002 | Schoenborn ................ 379/111 |
| 6,850,508 | B1 | * | 2/2005 | Chang et al. ................ 370/335 |
| 6,871,071 | B2 | * | 3/2005 | Takao et al. ................. 455/436 |
| 6,879,840 | B2 | * | 4/2005 | Razavilar et al. ............ 455/522 |
| 6,888,810 | B2 | * | 5/2005 | Faber ......................... 370/335 |
| 6,914,890 | B1 | * | 7/2005 | Tobita et al. ................ 370/338 |
| 7,072,630 | B2 | * | 7/2006 | Lott et al. ................ 455/151.2 |
| 7,106,843 | B1 | * | 9/2006 | Gainsboro et al. .......... 379/191 |

(Continued)

FOREIGN PATENT DOCUMENTS

JP     2000-307635     11/2000

(Continued)

OTHER PUBLICATIONS

U.S. Appl. No. 11/498,753, filed Aug. 4, 2006, Kaburaki et al.

(Continued)

*Primary Examiner*—Thong H Vu
(74) *Attorney, Agent, or Firm*—Oblon, Spivak, McClelland, Maier & Neustadt, P.C.

(57) ABSTRACT

A radio communication apparatus for transmitting and receiving a plurality of frames to and from another radio communication apparatus, comprises a first transmitting unit configured to sequentially transmit a plurality of frames at a plurality of transmission rates to the another radio communication apparatus, a second transmitting unit configured to transmit, to the another radio communication apparatus, an inquiry signal for inquiring which frames included in the frames are received by the another radio communication apparatus, a receiving unit configured to receive, from the another radio communication apparatus, information indicating which frames included in the frames are received or fail to be received, and a rate setting unit configured to set the first transmitting unit to a transmission rate used for next transmission of frames to the another radio communication apparatus, based on the received information.

20 Claims, 13 Drawing Sheets

U.S. PATENT DOCUMENTS

| | | | |
|---|---|---|---|
| 7,174,179 B2* | 2/2007 | Krebs et al. | 455/504 |
| 7,203,498 B2* | 4/2007 | Kato et al. | 455/452.2 |
| 7,327,716 B2* | 2/2008 | Fong et al. | 370/349 |
| 7,369,501 B2* | 5/2008 | Kim et al. | 370/235 |
| 2003/0198210 A1* | 10/2003 | Haim | 370/342 |
| 2003/0200140 A1* | 10/2003 | Hars | 705/14 |
| 2004/0136373 A1* | 7/2004 | Bareis | 370/392 |
| 2004/0203834 A1* | 10/2004 | Mahany | 455/453 |
| 2005/0113104 A1* | 5/2005 | Chen et al. | 455/452.2 |
| 2005/0136844 A1* | 6/2005 | Giesberts et al. | 455/67.13 |
| 2005/0163058 A1* | 7/2005 | Nabetani et al. | 370/252 |
| 2007/0115915 A1* | 5/2007 | Sheng et al. | 370/350 |
| 2007/0186002 A1* | 8/2007 | Campbell et al. | 709/231 |

FOREIGN PATENT DOCUMENTS

| | | |
|---|---|---|
| JP | 2001-103041 | 4/2001 |
| JP | 2002-26926 | 1/2002 |
| JP | 2003-51781 | 2/2003 |
| JP | 2003-069472 | 3/2003 |
| JP | 2003-244105 | 8/2003 |
| JP | 2003-319457 | 11/2003 |
| JP | 2003-319458 | 11/2003 |
| JP | 2006-505149 | 2/2006 |
| WO | WO 03/005644 A1 | 1/2003 |

OTHER PUBLICATIONS

U.S. Appl. No. 10/767,574, filed Sep. 18, 2003, Vasseur et al., entitled Computing Inter-Autonomous System MPLS Traffic Engineering LSP Paths.

U.S. Appl. No. 11/001,349, filed Dec. 1, 2004, Vasseur et al., entitled Propagation of Routing Information in RSVP-TE for Inter-Domain TE-LSPS.

U.S. Appl. No. 11/012,044, Vasseur et al., entitled Border Router Protection With Backup Tunnel Stitching in a Computer Network.

Perlman, Radia, Interconnections Second Edition: Bridges, Routers, Switches, and Internetworking Protocols, Addison Wesley, 1999.

Pan et al., Fast Reroute Extensions to RSVP-TE for LSP Tunnels (draft-ietf-mpls-rsvp-1sp-fastreroute-07.txt), Internet Draft, Feb. 2005 pp. 1-35.

Vasseur, J.P. et al., RSVP Path Computation Request and Reply Messages (draft-vasseur-mpls-computation-rsvp-05.txt), Internet Draft, Jul. 2004, pp. 1-31.

Callon, R., RFC 1195, entitled Use of OSI ISIS for routing in TCP/IP and Dual Environments, Dec. 1990, pp. 1-80.

Rekhter, Y., RFC 1771, entitled A Border Gateway Protocol 4 (BGP-4), Mar. 1995, pp. 1-28.

Braden, R. et al., RFC 2205, entitled Resource ReSerVation Protocol (RSVP), Version 1 Functional Specification, Sep. 1997, pp. 1-112.

Moy, J., RFC 2328, entitled OSPF Version 2, Apr. 1998, pp. 1-183.

Coltun, R., RFC 2370, entitled The OSPF Opaque LSA Option, Jul. 1998, pp. 1-13.

Awduche, D. et al., RFC 3209, entitled RSVP-TE: Extensions to RSVP for LSP Tunnels Dec. 2001, pp. 1-43.

Katz, D. et al., RFC 3630, entitled Traffic Engineering (TE) Extensions to OSPF Version 2, Sep. 2003, pp. 1-14.

Smit, H., RFC 3784, entitled Intermediate-System-to-Intermediate-System (IS-IS) Extensions for Traffic Engineering (TE), Jun. 2004, pp. 1-13.

Mannie, E., RFC 3945, entitled Generalized Multi-Protocol Label Switching (GMPLS) Architecture, Oct. 2004, pp. 1-65.

Mannie, E., RFC 3946, entitled Generalized Multi-Protocol Label Switching (GMPLS) Extensions for Synchronous Optical Network (SONET) and Synchronous Digital Hierarchy (SDH) Control, Oct. 2004, pp. 1-25.

* cited by examiner

○ : Received
× : Non-received

| Temporary transmission rate | Received - signal intensity |
|---|---|
| 6Mbps | ~ - 85dBm |
| 9Mbps | ~ - 83dBm |
| 12Mbps | ~ - 80dBm |
| 18Mbps | ~ - 78dBm |
| 24Mbps | ~ - 76dBm |
| 36Mbps | ~ - 73dBm |
| 48Mbps | ~ - 70dBm |
| 54Mbps | ~ - 65dBm |

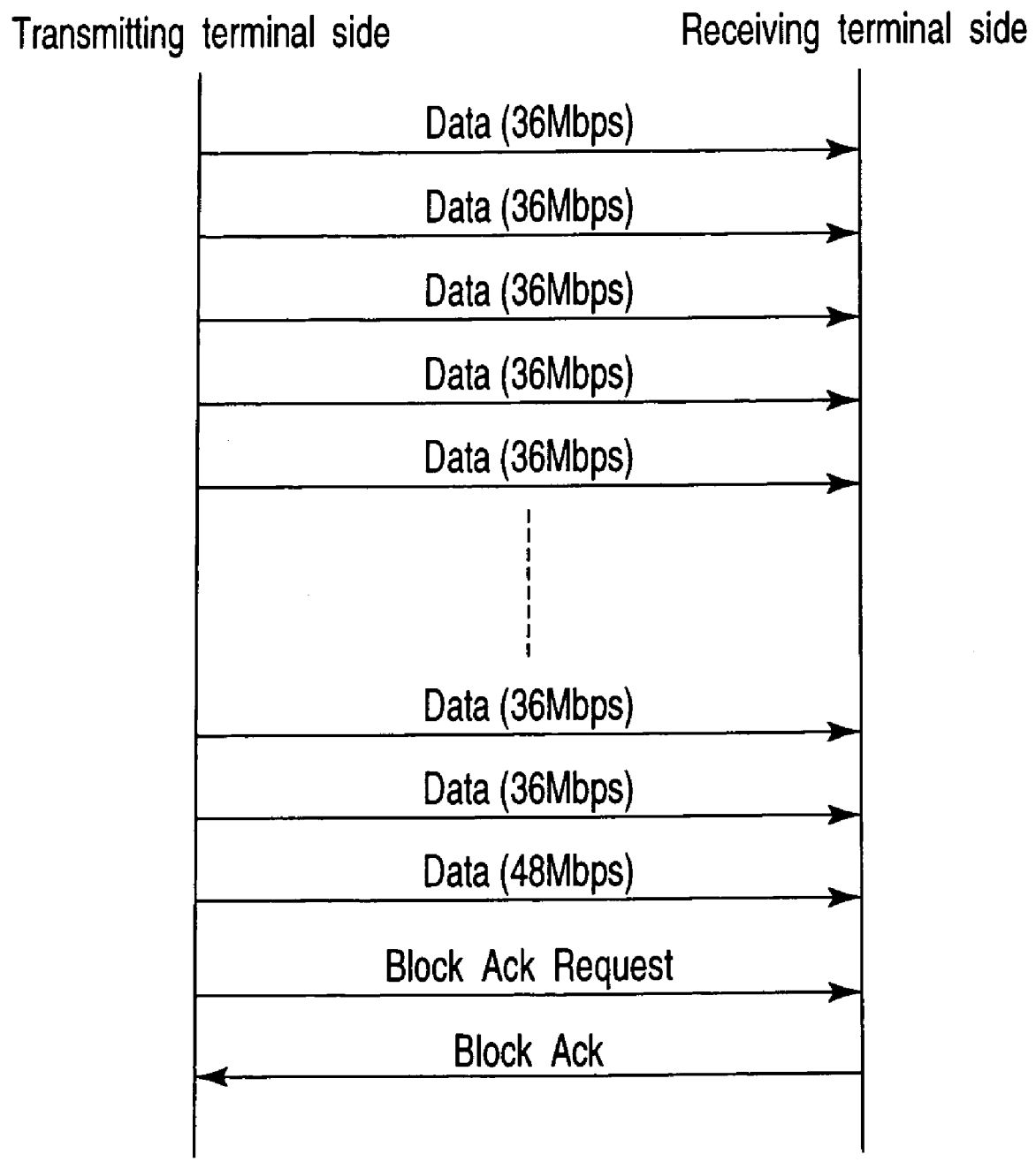
F I G. 1 5

RADIO COMMUNICATION APPARATUS, METHOD AND PROGRAM

CROSS-REFERENCE TO RELATED APPLICATIONS

This application is based upon and claims the benefit of priority from prior Japanese Patent Application No. 2004-017339, filed Jan. 26, 2004, the entire contents of which are incorporated herein by reference.

BACKGROUND OF THE INVENTION

1. Field of the Invention

The present invention relates to a radio communication apparatus, method and program for burst transmission in a packet communication system, and more particularly to a radio communication apparatus, method and program for determining transmission rate in accordance with radio signal propagation conditions.

2. Description of the Related Art

In many packet communication systems including IEEE 802.11 wireless LANs, data communication can be performed by selecting a supported transmission rate according to, for example, propagation conditions. To determine or change the transmission rate, quality information about the received signal at a destination apparatus, such as the received-signal intensity (RSSI) or signal-to-noise ratio (SNR), and/or whether an acknowledgement (ACK) signal is received from the destination apparatus, is utilized (see, for example, Jpn. Pat. Appln. KOKAI Publication No. 2003-51781).

In IEEE 802.11 wireless LANs, when data is burst-transmitted, as in the case of using the IEEE 802.11e Block Ack function, which is designed to enhance the function of the MAC layer, the conventional transmission rate determination/change method may raise the following problem.

When using received-signal quality information from a destination to determine transmission rate, the determined transmission rate is not always viable since the received-signal quality continuously varies because of such factors as fading. Moreover, if burst transmission is performed at the transmission rate determined from the received-signal quality information, the transmission rate cannot be changed since it cannot be determined during burst transmission whether received-signal quality information or ACK signal is received. Therefore, if the determined transmission rate is not viable, the transmission rate during burst transmission cannot be, for example, reduced, which inevitably increases retransmission and reduces throughput. At worst, communication may be completely interrupted because the number of retransmissions exceeds the maximum allowable.

BRIEF SUMMARY OF THE INVENTION

According to a first aspect of the invention, there is provided a radio communication apparatus for transmitting and receiving a plurality of frames to and from another radio communication apparatus, comprising:

a first transmitting unit configured to sequentially transmit a plurality of frames at a plurality of transmission rates to the another radio communication apparatus;

a second transmitting unit configured to transmit, to the another radio communication apparatus, an inquiry signal for inquiring which frames included in the frames are received by the another radio communication apparatus;

a receiving unit configured to receive, from the another radio communication apparatus, information indicating which frames included in the frames are received or fail to be received; and a rate setting unit configured to set the first transmitting unit to a transmission rate used for next transmission of frames to the another radio communication apparatus, based on the received information.

According to a second aspect of the invention, there is provided a radio communication apparatus for transmitting and receiving a plurality of frames to and from another radio communication apparatus, comprising:

a first transmitting unit configured to sequentially transmit a plurality of frames at a first transmission rate to the another radio communication apparatus;

a second transmitting unit configured to transmit, to the another radio communication apparatus, an inquiry signal for inquiring which frames included in the frames are received by the another radio communication apparatus;

a receiving unit configured to receive, from the another radio communication apparatus, information indicating which frames included in the frames are received or fail to be received; and a rate setting unit configured to set the first transmitting unit to a second transmission rate used for next transmission of frames to the another radio communication apparatus, based on the received information, the second transmission rate being acquired by increasing the first transmission rate if number of the frames received by the another radio communication apparatus is not lower than a first ratio, the second transmission rate being acquired by decreasing the first transmission rate if number of the frames received by the another radio communication apparatus is not higher than a second ratio.

According to a third aspect of the invention, there is provided a radio communication apparatus for transmitting and receiving a plurality of frames to and from another radio communication apparatus, comprising:

a first transmitting unit configured to sequentially transmit a plurality of frames at a plurality of transmission rates to the another radio communication apparatus, the transmission rates including a first transmission rate and a second transmission rate higher than the first transmission rate;

a second transmitting unit configured to transmit, to the another radio communication apparatus, an inquiry signal for inquiring whether frames included in the frames and transmitted at the second transmission rate are received by the another radio communication apparatus;

a receiving unit configured to receive, from the another radio communication apparatus, information indicating whether the frames included in the frames and transmitted at the second transmission rate are received or fail to be received; and a rate setting unit configured to set the first transmitting unit to the second transmission rate, if the information indicates that the frames included in the frames and transmitted at the second transmission rate are received, and to set the first transmitting unit to the first transmission rate if the information indicates that the frames included in the frames and transmitted at the second transmission rate fail to be received.

According to a fourth aspect of the invention, there is provided a radio communication apparatus for transmitting and receiving a plurality of frames to and from another radio communication apparatus, comprising:

a first transmitting unit configured to sequentially transmit a plurality of frames at a plurality of transmission rates to the another radio communication apparatus, the transmission rates including a first transmission rate and different transmission rates higher than the first transmission rate;

a second transmitting unit configured to transmit, to the another radio communication apparatus, an inquiry signal for inquiring whether each of frames included in the frames and transmitted at the different transmission rates is received by the another radio communication apparatus;

a receiving unit configured to receive, from the another radio communication apparatus, information indicating whether each of frames included in the frames and transmitted at the different transmission rates is received or fails to be received; and a rate setting unit configured to set the first transmitting unit to a second transmission rate used for next transmission of frames to the another radio communication apparatus, based on the received information.

According to a fifth aspect of the invention, there is provided a radio communication apparatus for transmitting and receiving a plurality of frames to and from another radio communication apparatus, comprising:

a first transmitting unit configured to sequentially transmit a plurality of frames at a plurality of transmission rates to the another radio communication apparatus, the transmission rates including a first transmission rate and different transmission rates lower than the first transmission rate;

a second transmitting unit configured to transmit, to the another radio communication apparatus, an inquiry signal for inquiring whether each of frames included in the frames and transmitted at the different transmission rates is received by the another radio communication apparatus;

a receiving unit configured to receive, from the another radio communication apparatus, information indicating whether each of frames included in the frames and transmitted at the different transmission rates is received or fails to be received; and a rate setting unit configured to set the first transmitting unit to a second transmission rate used for next transmission of frames to the another radio communication apparatus, based on the received information.

According to a sixth aspect of the invention, there is provided a radio communication method, used in a radio communication apparatus, for transmitting and receiving a plurality of frames to and from another radio communication apparatus, comprising:

sequentially transmitting a plurality of frames at a plurality of transmission rates to the another radio communication apparatus;

transmitting, to the another radio communication apparatus, an inquiry signal for inquiring which frames included in the frames are received by the another radio communication apparatus;

receiving, from the another radio communication apparatus, information indicating which frames included in the frames are received or fail to be received; and setting each of the transmission rates to a transmission rate used for next transmission of frames to the another radio communication apparatus, based on the received information.

According to a seventh aspect of the invention, there is provided a radio communication method, used in a radio communication apparatus, for transmitting and receiving a plurality of frames to and from another radio communication apparatus, comprising:

sequentially transmitting a plurality of frames at a first transmission rate to the another radio communication apparatus;

transmitting, to the another radio communication apparatus, an inquiry signal for inquiring which frames included in the frames are received by the another radio communication apparatus;

receiving, from the another radio communication apparatus, information indicating which frames included in the frames are received or fail to be received; and setting a transmission rate for transmitting the frames to a second transmission rate used for next transmission of frames to the another radio communication apparatus, based on the received information, the second transmission rate being acquired by increasing the first transmission rate if number of the frames received by the another radio communication apparatus is not lower than a first ratio, the second transmission rate being acquired by decreasing the first transmission rate if number of the frames received by the another radio communication apparatus is not higher than a second ratio.

According to a eighth aspect of the invention, there is provided a radio communication method, used in a radio communication apparatus, for transmitting and receiving a plurality of frames to and from another radio communication apparatus, comprising:

sequentially transmitting a plurality of frames at a plurality of transmission rates to the another radio communication apparatus, the transmission rates including a first transmission rate and a second transmission rate higher than the first transmission rate;

transmitting, to the another radio communication apparatus, an inquiry signal for inquiring whether frames included in the frames and transmitted at the second transmission rate are received by the another radio communication apparatus;

receiving, from the another radio communication apparatus, information indicating whether the frames included in the frames and transmitted at the second transmission rate are received or fail to be received; and setting a transmission rate for transmitting the frames to the second transmission rate, if the information indicates that the frames included in the frames and transmitted at the second transmission rate are received, setting the transmission rate to the first transmission rate if the information indicates that the frames included in the frames and transmitted at the second transmission rate fail to be received.

According to a ninth aspect of the invention, there is provided a radio communication method, used in a radio communication apparatus, for transmitting and receiving a plurality of frames to and from another radio communication apparatus, comprising:

sequentially transmitting a plurality of frames at a plurality of transmission rates to the another radio communication apparatus, the transmission rates including a first transmission rate and different transmission rates higher than the first transmission rate;

transmitting, to the another radio communication apparatus, an inquiry signal for inquiring whether each of frames included in the frames and transmitted at the different transmission rates is received by the another radio communication apparatus;

receiving, from the another radio communication apparatus, information indicating whether each of frames included in the frames and transmitted at the different transmission rates is received or fails to be received; and setting a transmission rate for transmitting the frames to a second transmission rate used for next transmission of frames to the another radio communication apparatus, based on the received information.

According to a tenth aspect of the invention, there is provided a radio communication method, used in a radio communication apparatus, for transmitting and receiving a plurality of frames to and from another radio communication apparatus, comprising:

sequentially transmitting a plurality of frames at a plurality of transmission rates to the another radio communication apparatus, the transmission rates including a first transmission rate and different transmission rates lower than the first transmission rate;

transmitting, to the another radio communication apparatus, an inquiry signal for inquiring whether each of frames included in the frames and transmitted at the different transmission rates is received by the another radio communication apparatus;

receiving, from the another radio communication apparatus, information indicating whether each of frames included in the frames and transmitted at the different transmission rates is received or fails to be received; and setting a transmission rate for transmitting the frames to a second transmission rate used for next transmission of frames to the another radio communication apparatus, based on the received information.

According to a eleventh aspect of the invention, there is provided a radio communication program stored in a computer readable medium, and causing a computer to execute that a radio communication apparatus transmits and receives a plurality of frames to and from another radio communication apparatus, comprising:

means for instructing the computer to sequentially transmit a plurality of frames at a plurality of transmission rates to the another radio communication apparatus;

means for instructing the computer to transmit, to the another radio communication apparatus, an inquiry signal for inquiring which frames included in the frames are received by the another radio communication apparatus;

means for instructing the computer to receive, from the another radio communication apparatus, information indicating which frames included in the frames are received or fail to received; and means for instructing the computer to set each of the transmission rates to a transmission rate used for next transmission of frames to the another radio communication apparatus, based on the received information.

According to a twelfth aspect of the invention, there is provided a radio communication program stored in a computer readable medium, and causing a computer to execute that a radio communication apparatus transmits and receives a plurality of frames to and from another radio communication apparatus, comprising:

means for instructing the computer to sequentially transmit a plurality of frames at a first transmission rate to the another radio communication apparatus;

means for instructing the computer to transmit, to the another radio communication apparatus, an inquiry signal for inquiring which frames included in the frames are received by the another radio communication apparatus;

means for instructing the computer to receive, from the another radio communication apparatus, information indicating which frames included in the frames are received or fail to be received; and means for instructing the computer to set a transmission rate for transmitting the frames to a second transmission rate used for next transmission of frames to the another radio communication apparatus, based on the received information, the second transmission rate being acquired by increasing the certain transmission rate if number of the frames received by the another radio communication apparatus is not lower than a first ratio, the second transmission rate being acquired by decreasing the first transmission rate if number of the frames received by the another radio communication apparatus is not higher than a second ratio.

According to a thirteenth aspect of the invention, there is provided a radio communication program stored in a computer readable medium, and causing a computer to execute that a radio communication apparatus transmits and receives a plurality of frames to and from another radio communication apparatus, comprising:

means for instructing the computer to sequentially transmit a plurality of frames at a plurality of transmission rates to the another radio communication apparatus, the transmission rates including a first transmission rate and a second transmission rate higher than the first transmission rate;

means for instructing the computer to transmit, to the another radio communication apparatus, an inquiry signal for inquiring whether frames included in the frames and transmitted at the second transmission rate are received by the another radio communication apparatus;

means for instructing the computer to receive, from the another radio communication apparatus, information indicating whether the frames included in the frames and transmitted at the second transmission rate are received or fail to be received; and means for instructing the computer to set a transmission rate for transmitting the frames to the second transmission rate, if the information indicates that the frames included in the frames and transmitted at the second transmission rate are received, and set the transmission rate to the first transmission rate if the information indicates that the frames included in the frames and transmitted at the second transmission rate fail to be received.

According to a fourteenth aspect of the invention, there is provided a radio communication program stored in a computer readable medium, and causing a computer to execute that a radio communication apparatus transmits and receives a plurality of frames to and from another radio communication apparatus, comprising:

means for instructing the computer to sequentially transmit a plurality of frames at a plurality of transmission rates to the another radio communication apparatus, the transmission rates including a first transmission rate and different transmission rates higher than the first transmission rate;

means for instructing the computer to transmit, to the another radio communication apparatus, an inquiry signal for inquiring whether each of frames included in the frames and transmitted at the different transmission rates is received by the another radio communication apparatus;

means for instructing the computer to receive, from the another radio communication apparatus, information indicating whether each of frames included in the frames and transmitted at the different transmission rates is received or fails to be received; and means for instructing the computer to set a transmission rate for transmitting the frames to a second transmission rate used for next transmission of frames to the another radio communication apparatus, based on the received information.

According to a fifteenth aspect of the invention, there is provided a radio communication program stored in a computer readable medium, and causing a computer to execute that a radio communication apparatus transmits and receives a plurality of frames to and from another radio communication apparatus, comprising:

means for instructing the computer to sequentially transmit a plurality of frames at a plurality of transmission rates to the another radio communication apparatus, the transmission rates including a first transmission rate and different transmission rates lower than the first transmission rate;

means for instructing the computer to transmit, to the another radio communication apparatus, an inquiry signal for inquiring whether each of frames included in the frames and transmitted at the different transmission rates is received by the another radio communication apparatus;

means for instructing the computer to receive, from the another radio communication apparatus, information indicating whether each of frames included in the frames and transmitted at the different transmission rates is received or fails to be received; and means for instructing the computer to set a transmission rate for transmitting the frames to a second transmission rate used for next transmission of frames to the another radio communication apparatus, based on the received information.

BRIEF DESCRIPTION OF THE SEVERAL VIEWS OF THE DRAWING

FIG. 15 is a view illustrating the flow of information between the radio transmitting apparatus of the fourth embodiment and a receiving terminal;

DETAILED DESCRIPTION OF THE INVENTION

Figure 1:
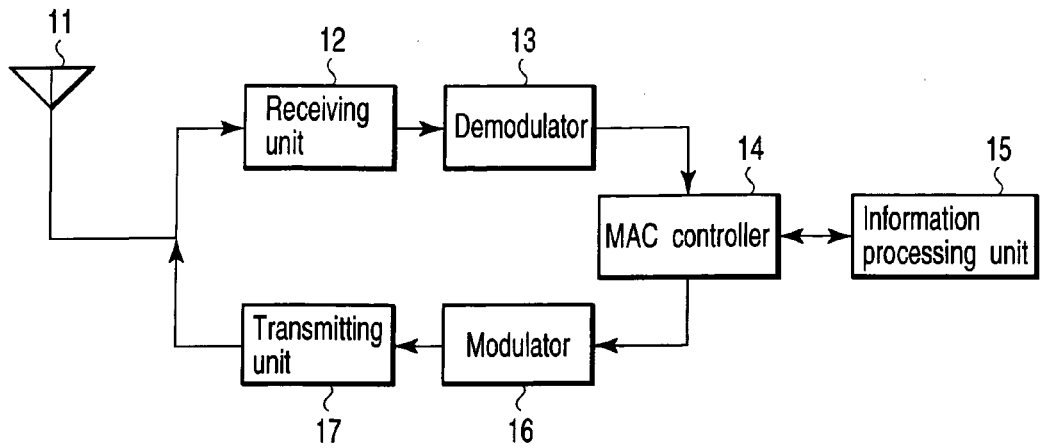
FIG. 1 is a block diagram illustrating a radio communication apparatus according to a first embodiment of the invention.

Radio communication apparatuses, methods and programs according to embodiments of the invention will be described in detail with reference to the accompanying drawings. These embodiments can be applied to packet communication systems. Descriptions will be given of the embodiments, assuming that they have the Block Ack function stipulated in IEEE 802.11e, which is acquired by extending the MAC layer stipulated in IEEE 802.11 that is one of the international standard measures for wireless LANs.

First Embodiment

Referring to the block diagram of FIG. 1, a radio communication apparatus according to a first embodiment of the invention will be described.

The radio communication apparatus of the first embodiment burst-transmits a plurality of frames at different transmission rates, receives information indicating which frame is received by a destination radio communication apparatus, and determines, from the information, the transmission rate to be used from now on. As seen from FIG. 1, the radio communication apparatus of the first embodiment comprises an antenna 11, receiving unit 12, demodulator 13, MAC controller 14, information processing unit 15, modulator 16 and transmitting unit 17.

The antenna 11 receives a signal containing data form the transmitting unit 17 and burst-transmits it to another radio communication apparatus or radio base station. Further, the antenna 11 receives a signal transmitted from another radio communication apparatus or radio base station, and transfers it to the receiving unit 12. The receiving unit 12 adjusts the gain of the signal received from the antenna 11, converts it into a baseband signal, subjects the signal to analog-to-digital conversion, and outputs the resultant signal to the demodulator 13. The demodulator 13 demodulates the converted signal to thereby restore it to a frame based on IEEE 802.11 and output the frame to the MAC controller 14.

The MAC controller 14 analyzes a frame received from another apparatus or base station. Specifically, the MAC controller 14 receives, for example, a control frame (control signal) called a Block Ack frame, and analyzes it. The Block Ack frame includes a bitmap field indicating which one (or ones) of the frames transmitted from the present radio communication apparatus (this will hereinafter also be referred to as "the originator apparatus") is (or are) received by another radio communication apparatus or base station (this will hereinafter also be referred to as "a destination apparatus"). The Block Ack frame will be described later in more detail with reference to FIG. 4.

Further, the MAC controller 14 generates transmission frames based on IEEE 802.11 and burst-transmits them at regular intervals, or performs predetermined access control. After burst-transmitting data at regular intervals, the MAC controller 14 performs control for transmitting, to a destination apparatus, a control frame (control signal) called a Block Ack Request frame and used to request to transmit a Block Ack frame. The Block Ack Request frame will be described later in detail with reference to FIG. 3. Furthermore, the MAC controller 14 determines, for example, transmission rate and burst amount.

When burst-transmitting data, the MAC controller 14 tries to burst-transmit data frames at all transmission rates supported by a destination apparatus. The MAC controller 14 detects transmission rates supported by a destination apparatus during initial authentication processing, and holds them as supported-transmission-rate information. The MAC controller 14 refers to each Block Ack frame to determine whether the data frames transmitted at different transmission rates have been received by the destination apparatus, thereby determining the transmission rate to be used for next burst transmission.

During transmission, the information processing unit 15 outputs, to the MAC controller 14, an instruction made by a user or transmission data. During reception, the unit 15 receives, from the MAC controller 14, data included in a received frame, and performs processing such as display of the data.

The modulator 16 performs modulation using a modulation scheme corresponding to the transmission rate designated by the MAC controller 14, and outputs the modulated signal to the transmitting unit 17. The transmitting unit 17 performs digital-to-analog conversion on the signal input, then performs frequency conversion on the resultant analog signal to obtain a radio signal of a predetermined frequency, and transmits the frequency-converted signal to another radio communication apparatus or base station via the antenna 11.

Figure 2:
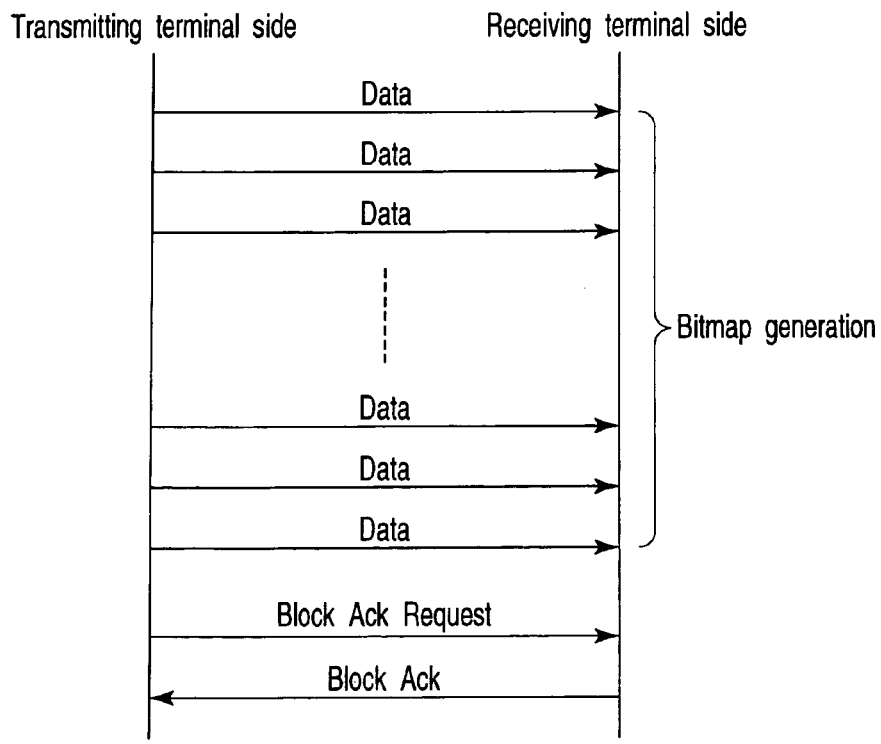
FIG. 2 is a view illustrating the flow of information between a general radio transmitting terminal and receiving terminal.

Referring now to the flow of information shown in FIG. 2, a description will be given of a case where data is burst-transmitted from a transmitting apparatus (originator apparatus) to a receiving apparatus (destination apparatus). The Block Ack function shown in FIG. 2 is stipulated in IEEE 802.11e.

After burst-transmitting data at regular intervals, the originator apparatus transmits, to the destination apparatus, a control frame (control signal) called a Block Ack Request frame, in order to request to transmit a control frame called a Block Ack frame. The Block Ack frame contains a bitmap field indicating the data receiving history of a receiving apparatus to which data is burst-transmitted. Referring to the bitmap field of the Block Ack frame, the originator apparatus can detect data to-be-retransmitted.

Each time the destination apparatus receives data transmitted by burst transmission, it generates a bitmap field content, reflects the content in the bitmap field of the Block Ack frame, and issues a request to retransmit data if there is any data that could not be received.

Figure 3:
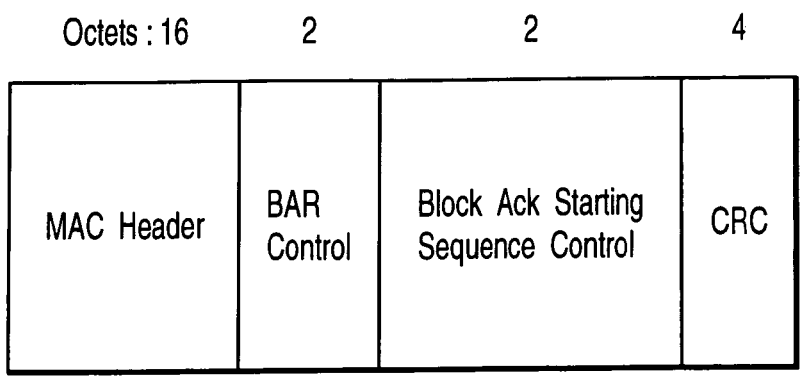
FIG. 3 is a view illustrating the format of the Block Ack Request frame appearing in FIG. 2.

Referring then to FIG. 3, the format of the Block Ack Request frame will be described. As seen from FIG. 3, the Block Ack Request frame comprises MAC Header, BAR Control, Block Ack Starting Sequence Control and Cyclic Redundancy Check characters (CRC).

MAC Header includes a destination address (i.e., the address of the destination apparatus) and originator address (i.e., the address of the originator apparatus). BAR Control includes traffic identifier information of transmitted data. Block Ack Starting Sequence Control includes information indicating the frame number at which the originator apparatus starts burst transmission. CRC includes cyclic redundancy check characters, i.e., characters used for error detection performed at both the transmitting and receiving sides. The cyclic redundancy check is one check scheme for use in data transmission, in which frames are transmitted with a redundancy character assigned to each frame, and it is determined from the redundancy characters whether the contents of transmission were correct. This cyclic redundancy check is expected to be useful for continuous errors that occur for a certain period (burst errors).

Figure 4:
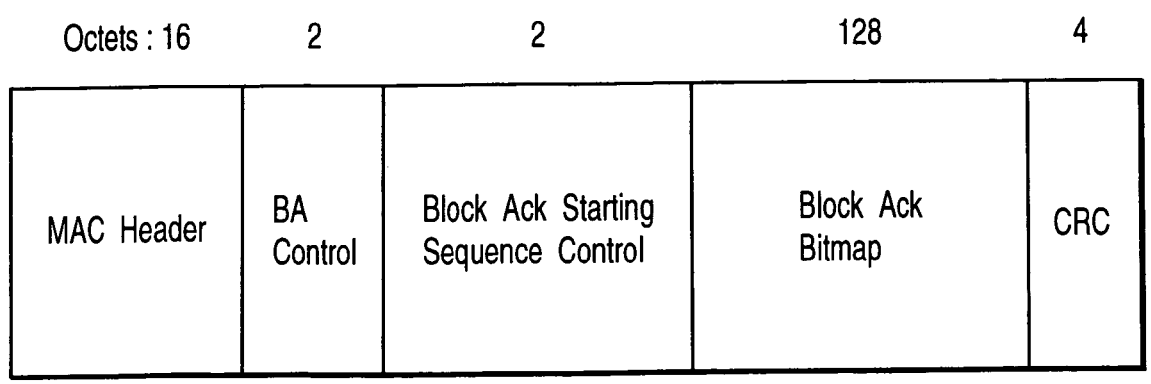
FIG. 4 is a view illustrating the format of the Block Ack frame appearing in FIG. 2.

Referring to FIG. 4, the format of the Block Ack frame will be described. As seen from FIG. 4, the Block Ack frame comprises MAC Header, BA Control, Block Ack Starting Sequence Control, Block Ack Bitmap and CRC. MAC Header includes a destination address and originator address as described above. BA Control includes traffic identifier information of transmitted data, which is a copy of the identifier information of the Block Ack Request frame. Block Ack Bitmap indicates the frame receiving history of the destination apparatus, beginning from the number of a burst-transmission starting frame included in Block Ack Starting Sequence Control. In this bitmap, one frame corresponds to one bit, and each received frame contains "1" as information, and each non-received frame contains "0" as information. CRC includes, as described above, a cyclic redundancy check characters, i.e., characters used for error detection performed at both the transmitting and receiving sides.

Figure 5:
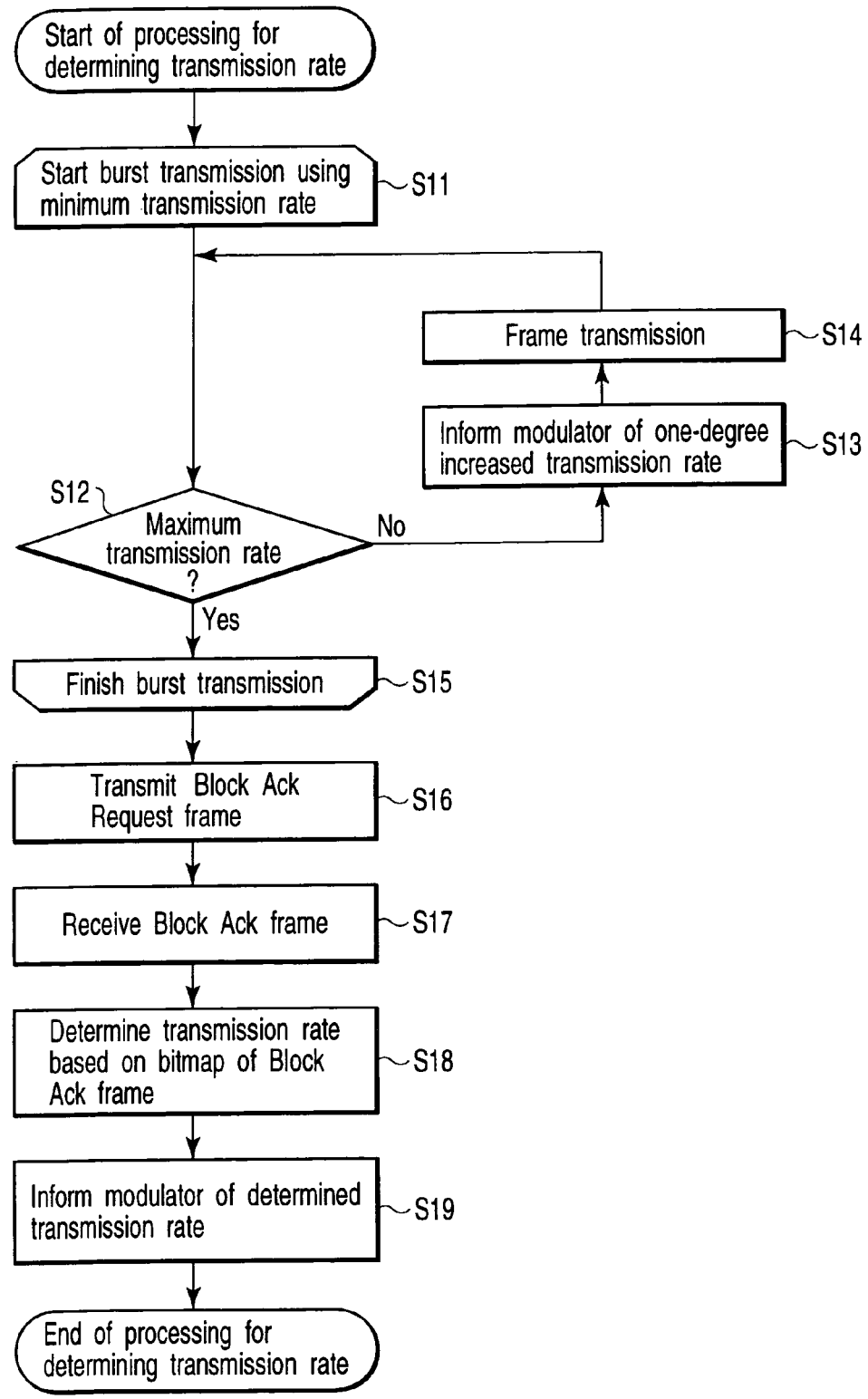
FIG. 5 is a flowchart useful in explaining an operation example of the radio communication apparatus of the first embodiment.

Referring to FIG. 5, a description will be given of an operation example of the radio communication apparatus of the embodiment for determining the transmission rate.

Firstly, the MAC controller 14 selects the minimum transmission rate from transmission rates at which the radio communication apparatus of the embodiment can transmit data, and transfers transmission data to the modulator 16 and transmitting unit 17, whereby the apparatus starts burst transmission of the data (step S11). Subsequently, the MAC controller 14 determines whether the transmission rate of the burst transmission is the maximum one of the transmission rates at which the radio communication apparatus of the embodiment can transmit data (step S12). If the transmission rate is not the maximum one, the program proceeds to step S13, whereas if it is the maximum one, the program proceeds to step S15. At step S15, the MAC controller 14 supplies the modulator 16 with an instruction to finish burst transmission, thereby finishing burst transmission.

Figures 6, 7A, 7B:
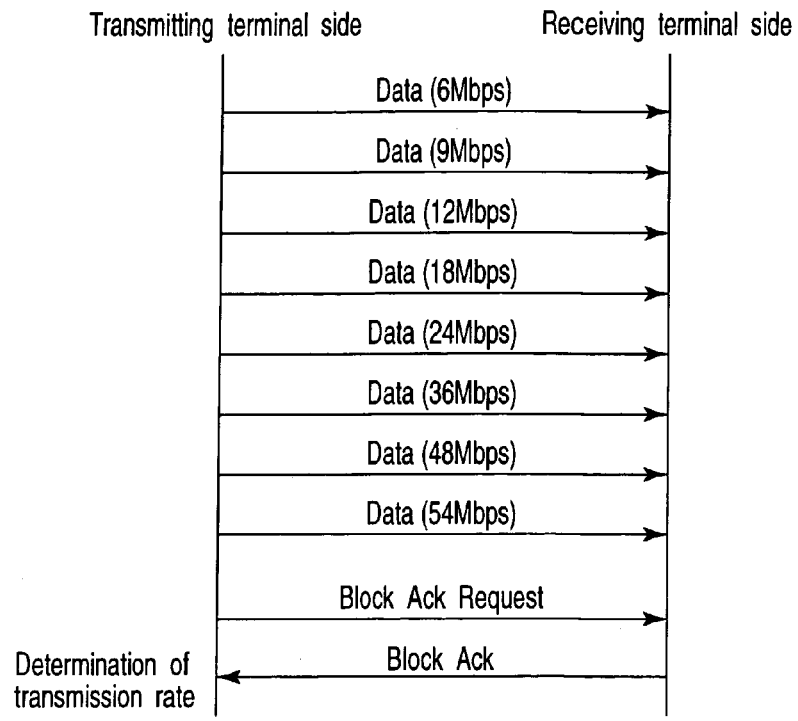
FIG. 6 is a view illustrating the flow of information between the radio transmitting apparatus of FIG. 1 and a receiving terminal.
FIGS. 7A and 7B are views illustrating received information included in the Block Ack Bitmap appearing in FIG. 4.

At step S13, the MAC controller 14 instructs the modulator 16 to increment the transmission rate by one level, thereby setting a new transmission rate. At the transmission rate set at step S13, the transmitting unit 17 transmits data, and the program returns to step S12 (step S14). Thus, by repeating the processes from step S11 to S14, the radio communication apparatus transmits data at every transmission rate ranging from the minimum transmission rate to the maximum transmission rate. In other words, the radio communication apparatus of the embodiment burst-transmits a plurality of frames at different transmission rates. As shown in FIG. 6, the originator apparatus transmits data to the destination apparatus at every transmission rate ranging from a minimum rate of 6 Mbps (bit per second) to a maximum rate of 54 Mbps via 9 Mbps, 12 Mbps, . . . .

At step S16, the MAC controller 14 instructs the modulator 16 to transmit a Block Ack Request frame to the destination apparatus, whereby this frame is transmitted to the designation apparatus. The destination apparatus, in turn, transmits a Block Ack frame in response to the Block Ack Request frame. The receiving unit 12 of the originator apparatus receives the Block Ack frame (step S17). The MAC controller 14 of the originator apparatus analyzes the Block Ack frame, thereby determining at which transmission rates the destination apparatus could receive the transmission data, and setting the maximum one of the transmission rates as transmission rate used to transmit data to the destination apparatus next time (step S18). The MAC controller 14 informs the modulator 16 of the transmission rate determined at step S18 (step S19), and the modulator 16 performs setting for transmitting data frames at this transmission rate from now on.

In the example of FIG. 5, burst transmission is started with the minimum transmission rate, and finished with the maximum transmission rate. However, the order of burst transmission is not limited to this. It is sufficient if burst transmission is performed at all transmission rates including the minimum one to the maximum one. In other words, it is sufficient if the transmission rates at which data frames are burst-transmitted and received by the destination apparatus can be determined from the analysis of the bitmap field included in the Block Ack frame received by the originator apparatus. For example, burst transmission may be started with the maximum transmission rate, and finished with the minimum transmission rate.

Referring to FIGS. 6 and 7, a specific example of the operation illustrated in FIG. 5 will be described. In this case, the physical layer is based on IEEE 802.11a, and the destination apparatus support all transmission rates.

When the physical layer is based on IEEE 802.11a, 8 transmission rates, such as 6 Mbps, 9 Mbps, 12 Mbps, 18 Mbps, 24 Mbps, 36 Mbps, 48 Mbps and 54 Mbps, can be set. Accordingly, at steps S11 to S15, data frames are burst-transmitted at all the eight transmission rates to the destination apparatus.

After burst transmission of data frames, the originator apparatus transmits a Block Ack Request frame to the destination apparatus, receives a bitmap field included in a Block Ack frame transmitted from the destination apparatus in reply to the Block Ack Request frame (step S17), and determines the transmission rate used for the next burst transmission, based on the bitmap field (step S18). The bitmap field holds the information as shown in FIGS. 7A and 7B. For example, the maximum transmission rate at which transmission is performed without errors is used for the next burst transmission, and all data including to-be-retransmitted frames is transmitted at this maximum transmission rate. Specifically, if the bitmap field holds the information shown in FIG. 7A, the transmission rate is set to 36 Mbps, while if the bitmap field holds the information shown in FIG. 7B, the transmission rate is set to 18 Mbps. In the case of FIG. 7A, the destination apparatus has received a data frame transmitted at any one of the transmission rates ranging from 6 Mbps to 36 Mbps, therefore the maximum transmission rate is determined 36 Mbps. In the case of FIG. 7B, although the destination apparatus has received a data frame transmitted at the transmission rate of 36 Mbps, it could not receive a data frame transmitted at the transmission rate of 24 Mbps. Therefore, the maximum transmission rate is determined to be 18 Mbps that is included in the transmission rates of 6 Mbps to 18 Mbps at which the destination apparatus could receive data frames.

Figure 8:
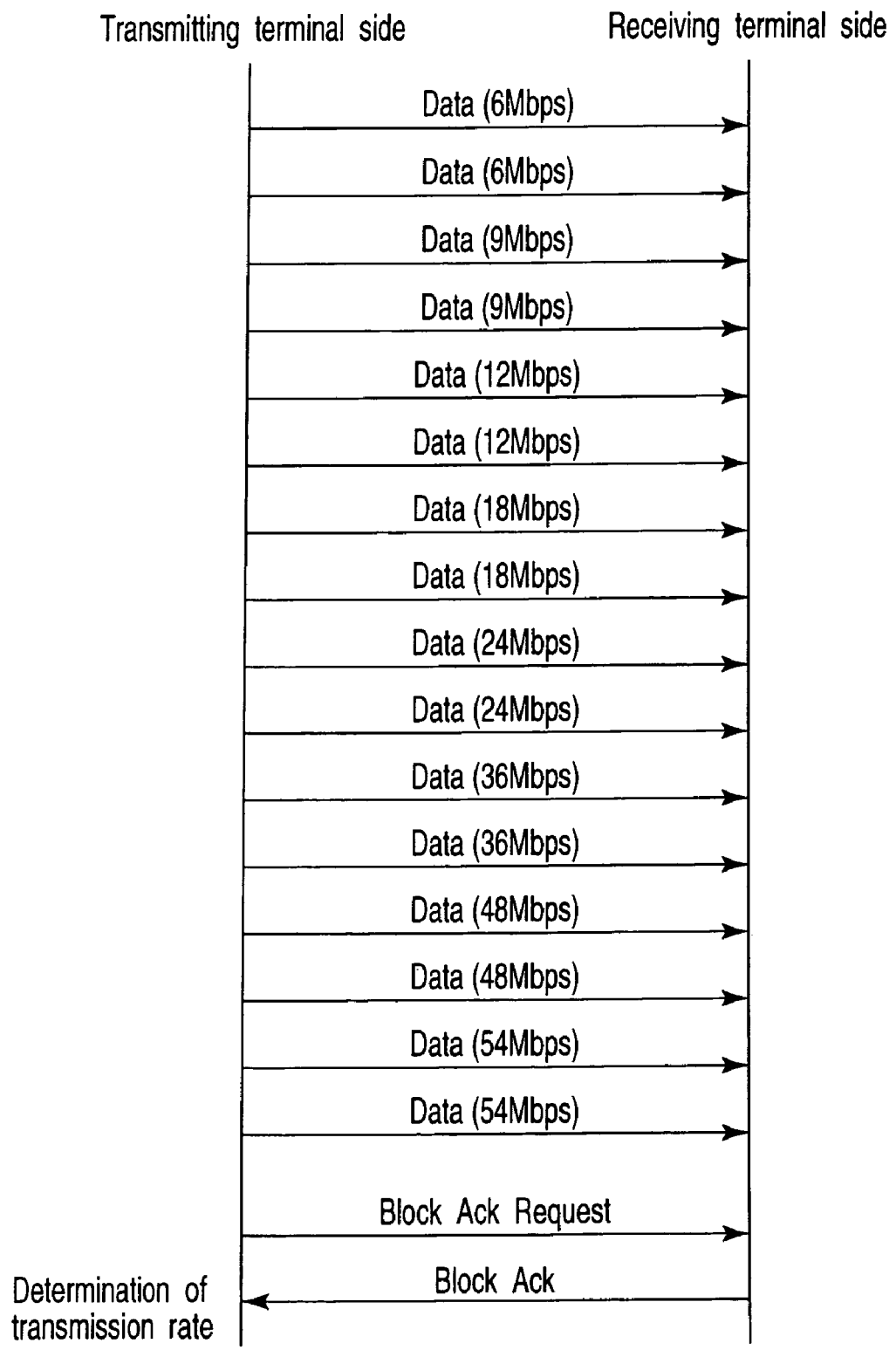
FIG. 8 is a view illustrating a modification of FIG. 6.

In the example of FIG. 6, one frame is transmitted at each transmission rate. However, to more accurately determine the transmission rate, a plurality of frames may be transmitted at each transmission rate as shown in FIG. 8. In the example of FIG. 8, the number of frames transmitted at each transmission rate is two. In this case, the number of data items transmitted from the originator apparatus to the destination apparatus is twice the number of data items in FIG. 6. As a result, the destination apparatus can exclude cases where it cannot receive data for some reason other than the reason that the transmission rate is too high, whereby a more appropriate and accurate transmission rate can be determined.

Further, the frame to be burst-transmitted to determine the transmission rate may be a live data frame including live data, or a dummy frame containing no data field, called a null frame and stipulated in IEEE 802.11. In the case of null-frame transmission, even if the bitmap field of a Block Ack frame indicates that the null frame is not received, it is not necessary to retransmit the null frame since this frame is a dummy frame. Further, since, in general, the amount of data contained in a null frame is smaller than that contained in a live data frame, it is preferable to use a null frame to reduce the processing load of the radio communication apparatus.

It is considered advisable to perform this type of transmission rate determination when the transmission rate is not yet determined and is to be determined for the first time as the initial transmission rate. However, this determination may be used to change the already determined transmission rate.

Further, the MAC controller 14 may be modified so that it receives a request to change the transmission rate, causes the modulator 16 to reset the transmission rate, and changes the burst amount. In this modification, the MAC controller 14 designates reduction of burst amount during burst transmission immediately after the determination of the transmission rate, compared to that before the determination. After that, the MAC controller 14 designates gradual increase of burst amount each time burst transmission is performed at the determined transmission rate. The burst amount is finally increased up to the maximum allowable for burst transmission. However, this control should be appropriately changed. For example, if the ratio of the number of frames that could not be received by the destination apparatus to the number of frames burst-transmitted exceeds a certain value, burst amount may not necessarily be increased but kept unchanged. Of course, this modification is applied only to the case where the data frame is a live-data frame, and not to the case the data frame is a null frame.

By virtue of the above operation of the MAC controller 14 to reduce the burst amount, the required transmission time of the originator apparatus is reduced, and the required receiving time of the destination apparatus is also reduced. Accordingly, the time required for the originator apparatus to receive a Block Ack frame from the destination apparatus is reduced. This enables the determination as to whether the transmission rate should be changed to be quickly performed, therefore enables the chance of burst transmission at a more appropriate transmission rate to be increased. This also prevents unnecessary retransmission of data.

In the above-described first embodiment, since the transmission rate is determined based on the result of actual data transmission of the originator apparatus, a more reliable transmission rate can be determined compared to the determination of the transmission rate based on received-signal quality information that is not always reliable. This prevents reduction of the throughput of burst transmission, and enhances the effective transmission rate of data.

Second Embodiment

Figure 9:
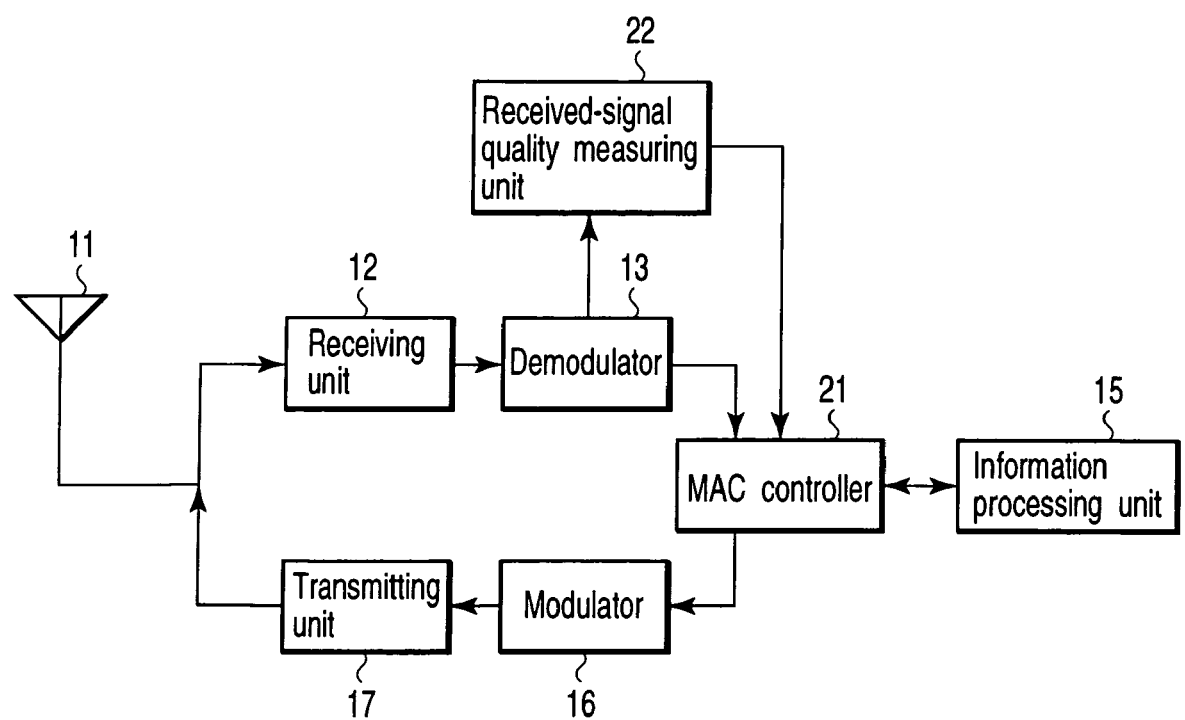
FIG. 9 is a block diagram illustrating a radio communication apparatus according to a second embodiment of the invention.

A radio communication apparatus of a second embodiment differs from that of the first embodiment in that the former additionally employs a received-signal quality measuring unit 22 as shown in FIG. 9. In accordance with the addition of the received-signal quality measuring unit 22, the MAC controller 21 in the second embodiment performs control different from that of the MAC controller 14 of the first embodiment. The other structures of the radio communication apparatus of the second embodiment are similar to those of the first embodiment. In the first and second embodiments, like reference numerals denote like components, and duplication of explanation will be avoided.

The received-signal quality measuring unit 22 measures the quality of a frame received from a destination apparatus. The received-signal quality is, for instance, a received-signal intensity and signal-to-noise power ratio. However, the received-signal quality is not limited to them, if there is any other indicator of the received-signal quality. A description will be given of the case where the received-signal intensity is used as the received-signal quality.

A MAC controller 21 firstly determines a temporary transmission rate based on the received-signal quality measured by the received-signal quality measuring unit 22. The MAC controller 21 stores a transmission rate reference table that holds transmission rates and received field intensities corresponding thereto. Using this table, the MAC controller 21 determines the temporary transmission rate. When performing burst-transmission using the Block Ack function, various management frames are exchanged before burst transmission, therefore the field intensity of each signal transmitted from a destination apparatus can be measured. Alternatively, the transmission rate reference table may be stored in a memory (not shown), to which the MAC controller 21 refers.

After that, the MAC controller 21 instructs the modulator 16 and transmitting unit 17 to burst-transmit, to the destination apparatus, a plurality of data items at a plurality of transmission rates including and near the temporary transmission rate. For instance, the MAC controller 21 instructs them to perform burst transmission at the temporary transmission rate, the transmission rate lower than and closest to the temporary transmission rate, and the transmission rate higher than and closest thereto. In other words, the transmission rate is limited to a certain range using the temporary transmission rate, and data is transmitted to the destination apparatus at a plurality of trial transmission rates, thereby determining the final transmission rate. In the second embodiment, since data is transmitted using several transmission rates close to the temporary transmission rate, the amount of data transmitted to determine the final transmission rate is smaller than in the first embodiment in which data is transmitted at all transmission rates ranging from the minimum one to the maximum one.

Figure 10:
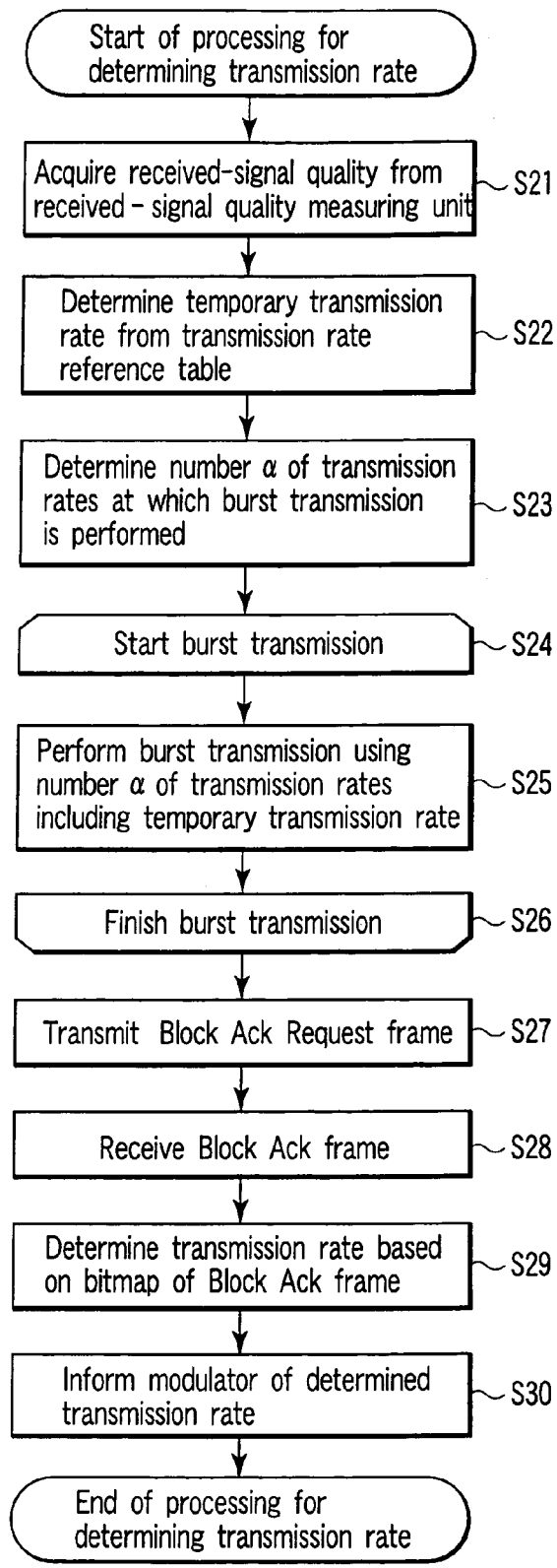
FIG. 10 is a flowchart useful in explaining an operation example of the radio communication apparatus of the second embodiment.

Referring to FIG. 10, an operation example of the radio communication apparatus of the second embodiment performed to determine the transmission rate will be described.

Firstly, the MAC controller 21 acquires a received-signal intensity as a received-signal quality measured by the received-signal quality measuring unit 22 (step S21). The MAC controller 21 refers to the transmission rate reference table stored therein to determine the temporary transmission rate based on the acquired received-signal intensity (step S22). The transmission rate reference table is prepared so that, for example, the packet error ratio and bit error ratio corresponding to each measured received-signal intensity is 10% or less and $10^{-3}$% or less, respectively.

Figures 11, 12:
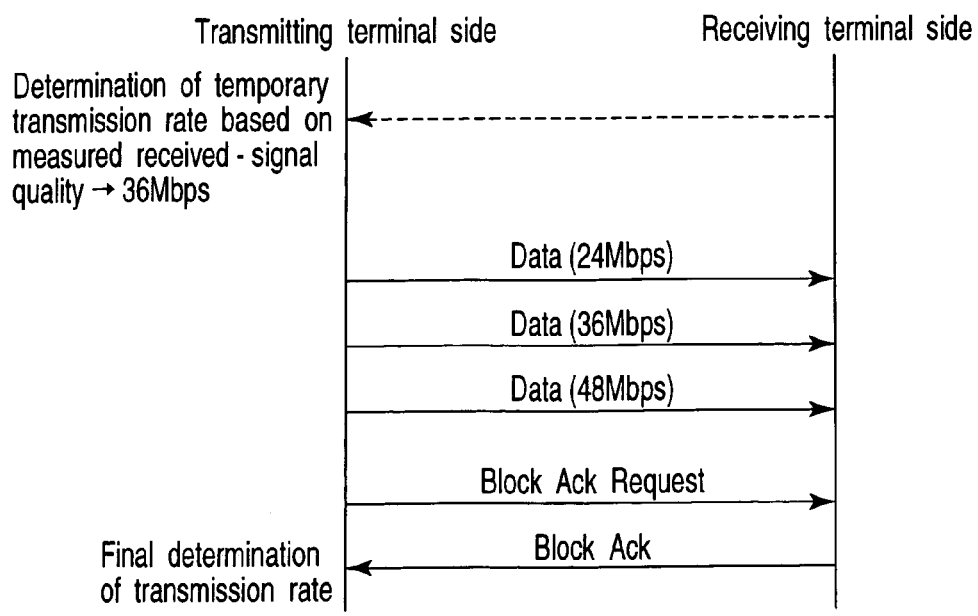
FIG. 11 is a transmission rate reference table referred to by the MAC controller appearing in FIG. 9.
FIG. 12 is a view illustrating the flow of information between the radio transmitting apparatus of FIG. 9 and a receiving terminal.

Referring now to FIG. 11, a description will be given of an example of the transmission rate reference table referred to at step S22. The transmission rate reference table is provided for determining the temporary transmission rate based on the received-signal intensity. For instance, the transmission rate reference table is designed so that the temporary transmission rate is uniquely determined from the received-signal intensity as shown in FIG. 11. More specifically, if, for example, the received-signal quality measuring unit 22 determines that the field intensity of a signal received from the destination apparatus is −72 dBm, the temporary transmission rate is 36 Mbps from FIG. 11.

Subsequently, the MAC controller 21 determines the number α of transmission rates at which data is burst-transmitted (step S23). That is, the number α of different transmission rates at which data is burst-transmitted to the destination apparatus. The MAC controller 21 transfers transmission data to the modulator 16 and transmitting unit 17, whereby the radio communication apparatus starts burst transmission of data (step S24). The MAC controller 21 instructs the modulator 16 and transmitting unit 17 to burst-transmit the transmission data at the temporary transmission rate determined at step S22, the transmission rate lower than and closest to the temporary transmission rate, and the transmission rate higher than and closest thereto (step S25). For instance, if the transmission rate is 36 Mbps when α is determined 3 at step S23, data is burst-transmitted at 24 Mbps, 36 Mbps and 48 Mbps. After data is transmitted at the temporary transmission rate and the lower and higher transmission rate closest thereto, the MAC controller 21 instructs the modulator 16 to stop burst transmission, thereby finishing burst transmission (step S26).

The processes after that are similar to those performed in the first embodiment (i.e., steps S16 to S19 in FIG. 5). That is, a Block Ack Request frame is transmitted to the destination apparatus (step S27), then the destination apparatus transmits a Block Ack frame to the originator apparatus in response to the Request frame, and the originator apparatus receives the Block Ack frame (step S28). The MAC controller 21 of the originator apparatus analyzes the Block Ack frame to determine the transmission rates at which the destination apparatus could receive the transmission data. After that, the MAC controller 21 sets, to the transmission rate used from now on, the maximum one, for example, of the transmission rates at which the destination apparatus could receive the transmission data (step S29). Thereafter, the MAC controller 21 informs the modulator 16 of the transmission rate determined at step S29 (step S30), and the modulator 16 performs setting for transmitting a data frame at this transmission rate.

Referring to FIG. 12, an example of the operation illustrated in FIG. 10 will be described. Firstly, at step S21, the transmission rate reference table is referred to and the temporary transmission rate is set to 36 Mbps based on the signal received from the destination apparatus. Assume here that the number of transmission rates at which the originator apparatus burst-transmits data is 3. Accordingly, the originator apparatus burst-transmits data to the destination apparatus at 24 Mbps, 36 Mbps and 48 Mbps (i.e., the temporary transmission rate and the lower and higher transmission rates closest to the temporary transmission rate). At step S27, the originator apparatus transmits a Block Ack Request frame to the destination apparatus, receives a Block Ack frame therefrom, and acquires the bitmap field of the Block Ack frame (step S28). Based on the bitmap field, the transmission rate used for burst transmission from now on is determined (step S29). The process performed after burst transmission is similar to those of the first embodiment shown in FIG. 5.

Although in the example shown in FIG. 12, only one frame is transmitted at each transmission rate, a plurality of frames may be transmitted at each transmission rate in order to more accurately determine the final transmission rate as described in the first embodiment.

It is considered preferable to apply the above-described transmission rate determination way at the initial stage at which no transmission rate is determined. However, the embodiment is not limited to this. The determination way may also be used to change a once-determined transmission rate.

In the second embodiment described above, data is transmitted at a temporary transmission rate estimated from the quality of a signal output from the destination apparatus, and at the lower and higher transmission rates closest to the temporary one. Accordingly, the number of frames transmitted to determine the final transmission rate can be reduced compared to the case where a frame (or frames) is transmitted at every transmission rate supported.

Third Embodiment

A radio communication apparatus according to a third embodiment differs from that of the first embodiment shown in FIG. 1 only by the processing contents of the MAC controller 14. In the third embodiment, each time the MAC controller 14 receives a Block Ack frame after burst transmission, it calculates, from the bitmap field of the Block Ack frame, the ratio of the number of frames that could not be received by a destination apparatus to the number of frames burst-transmitted. If burst transmission with a frame number ratio of $\alpha_1$% or less continues a predetermined number $\beta_1$ of times or more, the MAC controller 14 performs control for increasing the transmission rate. In contrast, if burst transmission with a frame number ratio of $\alpha_2$% or more continues a predetermined number $\beta_2$ of times or more, the MAC controller 14 performs control for decreasing the transmission rate. Burst transmission may be performed only one time. Further, the predetermined numbers of $\beta_1$ and $\beta_2$ may be counted by a counter (not shown) which is incorporated in, for example, the MAC controller 14.

After that, to increase the transmission rate, the MAC controller 14 instructs the modulator 16 to set a transmission rate that is higher by one degree than the present transmission rate. On the other hand, to decrease the transmission rate, the MAC controller 14 instructs the modulator 16 to set a transmission rate that is lower by one degree than the present transmission rate.

Figure 13:
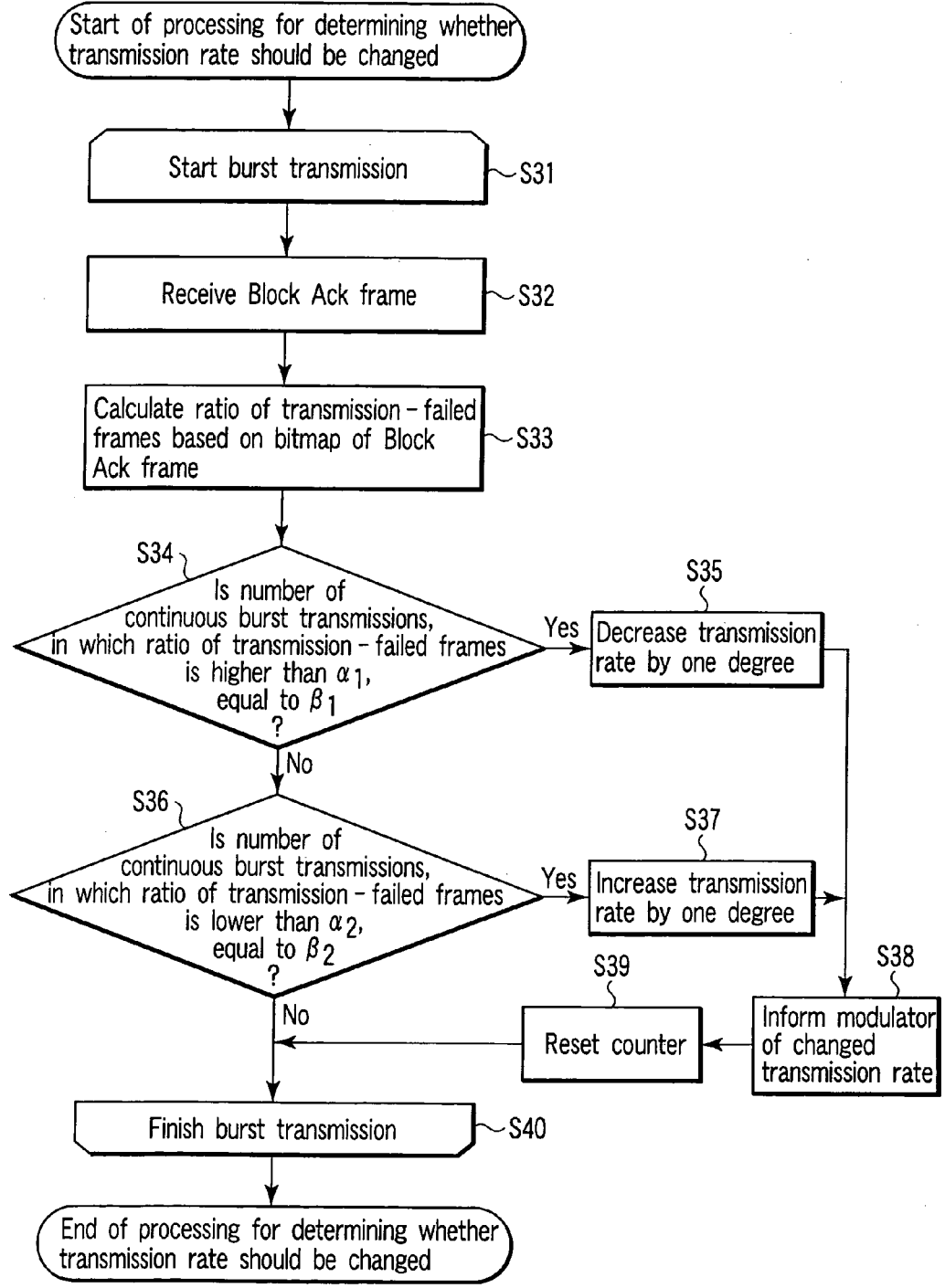
FIG. 13 is a flowchart useful in explaining an operation example of a radio communication apparatus according to a third embodiment.

Referring to FIG. 13, a description will be given of an operation example of the radio communication apparatus of the third embodiment performed to determine the transmission rate.

Firstly, in response to an instruction from the MAC controller 14, burst transmission of a plurality of data items using a certain transmission rate is started (step S31). The MAC controller 14 instructs the modulator 16 to transmit a Block Ack Request frame, whereby a Block Ack Request frame is transmitted to the destination apparatus. Upon receiving the Block Ack Request frame, the destination apparatus transmits a Block Ack frame to the originator apparatus. The receiving unit 12 of the originator apparatus receives the Block Ack frame (step S32). The MAC controller 14 analyzes the Block Ack frame, thereby determining how many data items have been received by the destination apparatus, and calculating the ratio of the number of frames that could not be received by the destination apparatus to the number of frames burst-transmitted (step S33).

At step S34, it is determined whether burst transmission in which the ratio determined at step S33 is higher than $\alpha_1$ continues a predetermined number $\beta_1$ of times or more (step S34). If it is determined at step S34 that burst transmission with a frame number ratio higher than $\alpha_1$ continues the predetermined number $\beta_1$ of times or more, the program proceeds to step S35. On the other hand, if it is determined at step S34 that burst transmission in which the radio is higher than $\alpha_1$ does not continue the predetermined number $\beta_1$ of times or more, the program proceeds to step S36. At step S35, the MAC controller 14 determines that transmission of a large number of frames has failed, and performs processing for decreasing the transmission rate by one degree.

At step S36, it is determined whether burst transmission in which the ratio determined at step S33 is lower than $\alpha_2$ continues a predetermined number $\beta_2$ of times or more (step S36). If it is determined at step S36 that burst transmission with a frame number ratio lower than $\alpha_2$ continues the predetermined number $\beta_2$ of times or more, the program proceeds to step S37. On the other hand, if it is determined that burst transmission with a frame number ratio lower than $\alpha_2$ does not continue the predetermined number $\beta_2$ of times or more, the program proceeds to step S40. At step S37, the MAC controller 14 determines that transmission of only a small number of frames has failed, and performs processing for increasing the transmission rate by one degree.

Thereafter, the MAC controller 14 informs the modulator 16 of the changed transmission rate (step S38), and the modulator 16 performs setting for transmitting a data frame at the changed transmission rate. Further, the count value of the counter at step S34 and/or step S36 is cleared for next counting (step S39), thereby terminating burst transmission (step S40).

It is considered preferable to apply the above-described transmission rate determination way in order to change a once-determined transmission rate (determined in, for example, the first or second embodiment). However, the embodiment is not limited to this. The determination way may also be used after a certain transmission rate is set at the initial stage where no transmission rate is determined.

In the third embodiment described above, even if a wave propagation state is changed during burst transmission performed at a determined transmission rate, an optimal transmission rate for the changed wave propagation state can be determined.

Fourth Embodiment

Like the third embodiment, a radio communication apparatus according to a fourth embodiment differs from that of the first embodiment shown in FIG. 1 only by the processing contents of the MAC controller 14. In the fourth embodiment, the MAC controller 14 performs control for making frames being transmitted at a certain transmission rate include a frame transmitted at a transmission rate higher by one degree than the first-mentioned transmission rate. For example, the last one of burst-transmitted frames is set as a frame to be transmitted at a transmission rate increased by one degree. If it is determined from a Block Ack frame supplied from a destination apparatus that the destination apparatus has received the frame transmitted at the transmission rate higher by one degree, the MAC controller 14 performs control for burst-transmitting next data at the transmission rate increased by one degree.

Figure 14:
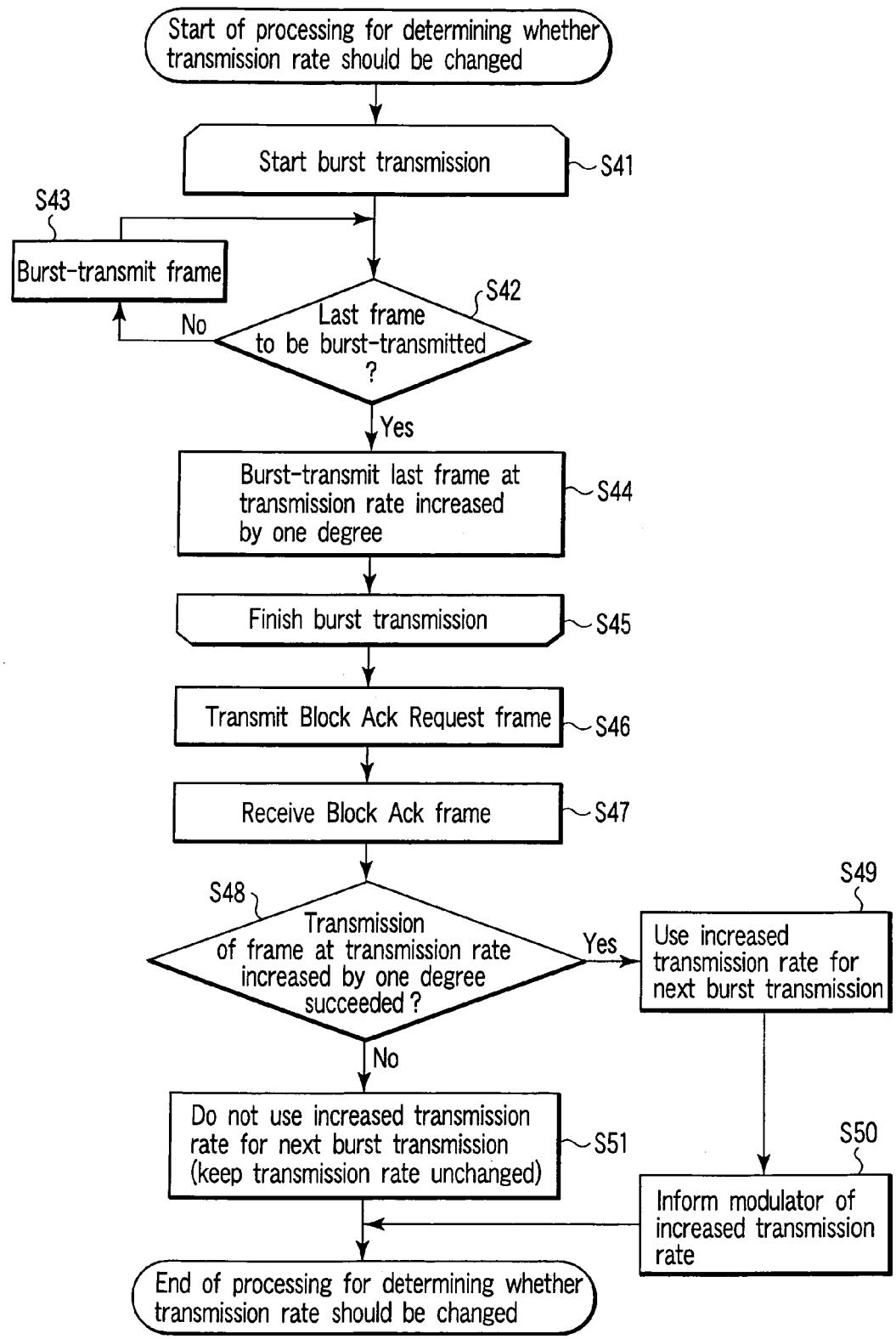
FIG. 14 is a flowchart useful in explaining an operation example of a radio communication apparatus according to a fourth embodiment.

Referring to FIGS. 14 and 15, a description will be given of an operation example of the radio communication apparatus of the fourth embodiment performed to determine the transmission rate. FIG. 14 is a flowchart useful in explaining an operation example of the radio communication apparatus of the fourth embodiment, and FIG. 15 is a sequence view illustrating the flow of information between the radio transmitting apparatus of the fourth embodiment and a receiving terminal as a destination apparatus.

Firstly, in accordance with an instruction issued from the MAC controller 14, burst transmission using a certain transmission rate is started (step S41). In FIG. 15, a plurality of data frames are burst-transmitted at 36 Mbps. The MAC controller 14 determines whether a data frame that is now being burst-transmitted is the last one (step S42). If this data frame is not the last data one, the program proceeds to step S43, whereas if it is the last one, the program proceeds to step S44. At step S43, the data frame is transmitted at the transmission rate determined at step S41. At step S44, the data frame is transmitted at a transmission rate higher by one degree than that used at step S41, thereby finishing burst transmission (step S45). In FIG. 15, the transmission rate increased by one degree corresponds to 48 Mbps. Further, the frame transmitted at a transmission rate higher by one degree than the present transmission rate may be a live data frame or a null frame.

The MAC controller 14 instructs the modulator 16 to transmit a Block Ack Request frame to the destination apparatus, whereby this frame is transmitted to the designation apparatus (step S46). Upon receiving the Block Ack Request frame, the destination apparatus transmits a Block Ack frame. The receiving unit 12 of the originator apparatus receives the Block Ack frame (step S47). The MAC controller 14 of the originator apparatus analyzes the Block Ack frame, thereby determining whether the destination apparatus could receive the frame transmitted at the transmission rate increased by one degree (step S48). If the destination apparatus could receive the frame, the program proceeds to step S49, whereas if the destination apparatus could not receive it, the program proceeds to step S51.

At step S49, the MAC controller 14 determines that the transmission rate can be increased, and hence that next burst transmission is started at the transmission rate increased by one degree. After that, the MAC controller 14 informs the modulator 16 of the changed transmission rate (step S50), and the modulator 16 performs setting for transmitting a data frame at this transmission rate.

At step S51, the MAC controller 14 determines that the transmission rate cannot be increased, and hence that next burst transmission is started with the transmission rate unchanged (i.e., the rate used at step S41).

It is considered preferable to apply the above-described transmission rate determination way in order to change a once-determined transmission rate (determined in, for example, the first or second embodiment). However, the embodiment is not limited to this. The determination way may also be used after a certain transmission rate is set at the initial stage where no transmission rate is determined.

Furthermore, although in the above example, only one frame is transmitted at the transmission rate increased by one degree, a plurality of frames may be transmitted at the one-degree increased transmission rate in order to more accurately determine the transmission rate. This can eliminate cases where the destination apparatus cannot receive data signals for some reason except for the reason that the transmission rate is too high, thereby enabling determination of a more appropriate transmission rate.

In the above-described fourth embodiment, a greater part of burst transmission is performed at a certain transmission rate, and the remaining part of burst transmission is performed at the transmission rate higher by one degree than the certain transmission rate. Accordingly, even if the wave propagation state is changed during burst transmission using the certain transmission rate, the transmission rate can be adjusted to the changed propagation state.

Fifth Embodiment

In a radio communication apparatus according to a fifth embodiment, when a request to change the transmission rate is issued as in the first to fourth embodiments, it is not directly satisfied, but the following processing is performed to finally determine the transmission rate. The radio communication apparatus of the fifth embodiment is similar to that of the first embodiment except for the processing contents of the MAC controller 14. When a request to change the transmission rate is issued, the MAC controller 14 of the fifth embodiment designates burst transmission of a plurality of data frames using a plurality of transmission rates equal to and higher than the present transmission rate (or equal to and lower than it). Further, the MAC controller 14 determines the transmission rate for next burst transmission based on the bitmap field of a Block Ack frame transmitted from a destination apparatus in reply to the burst-transmitted data frames.

Figure 16:
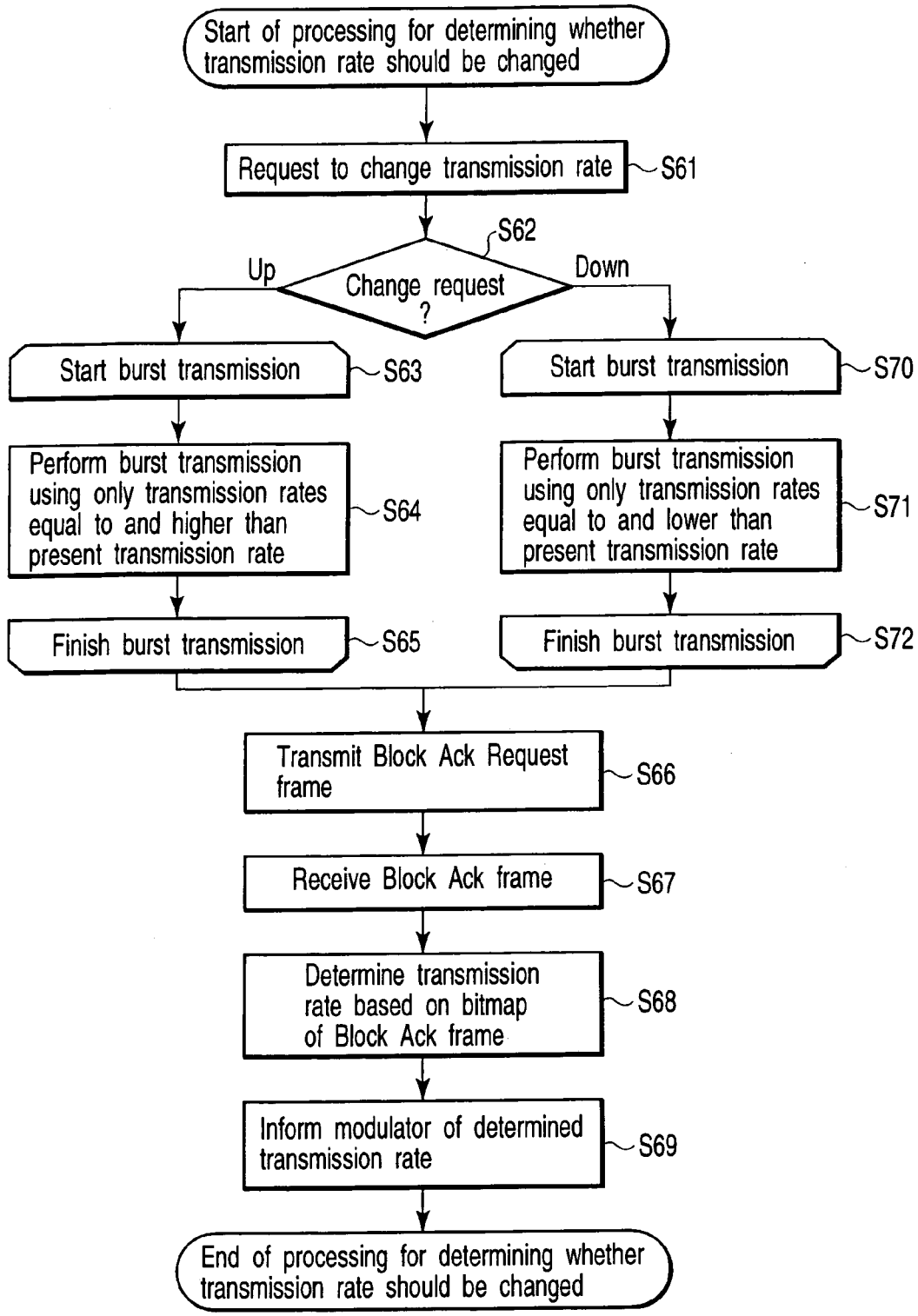
FIG. 16 is a flowchart useful in explaining an operation example of a radio communication apparatus according to a fifth embodiment.
Figure 17A:
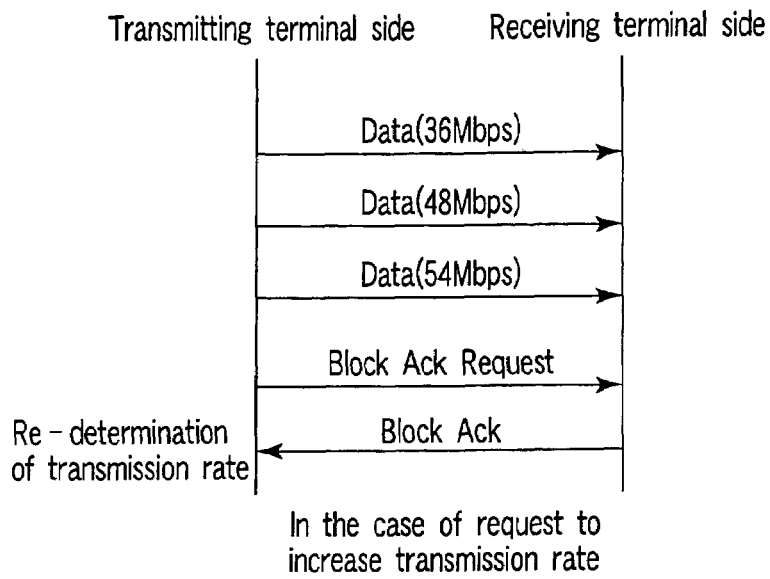
FIGS. 17A and 17B are views illustrating the flow of information between the radio transmitting apparatus of the fifth embodiment and a receiving terminal.
Figure 17B:
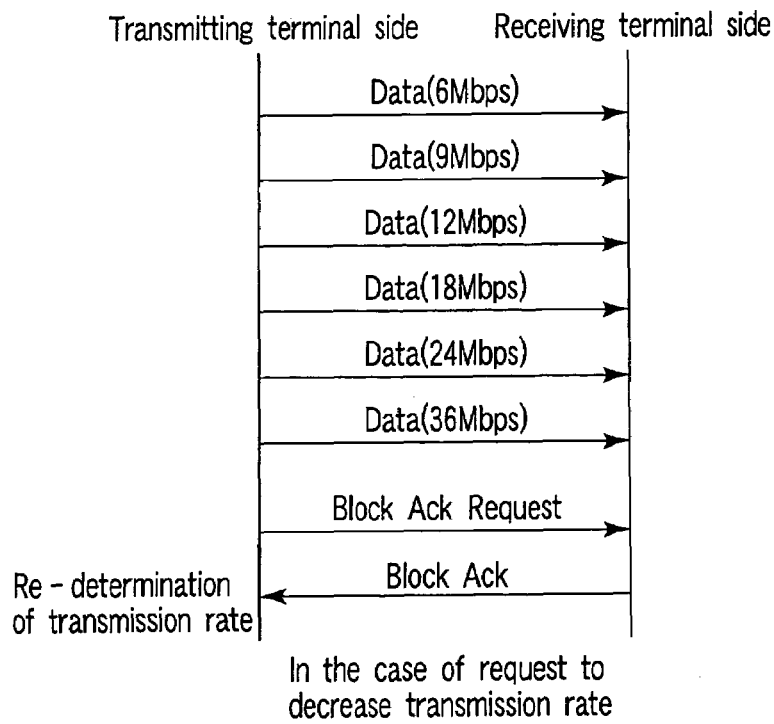

Referring to FIG. 16 and FIGS. 17A and 17B, a description will be given of an operation example of the radio communication apparatus of the fifth embodiment performed to determine the transmission rate. FIG. 16 is a flowchart useful in explaining the operation example. FIG. 17A is a view illustrating exchange of data between an originator apparatus and destination apparatus when a request to increase the transmission rate is issued. FIG. 17B is a view illustrating exchange of data between the originator apparatus and destination apparatus when a request to decrease the transmission rate is issued. In the cases of FIGS. 17A and 17B, the present transmission rate is 36 Mbps.

Firstly, the MAC controller 14 detects occurrence of a request to change the transmission rate (step S61). The MAC controller 14 determines whether the change request requests the increase or decrease of the transmission rate (step S62). If the change request requests the increase of the transmission rate, the program proceeds to step S63, while if the request requests the decrease of the transmission rate, the program proceeds to step S70.

At steps S63 and S64, burst transmission is started at a transmission rate (or transmission rates) equal to and/or higher than the present transmission rate set before the change request. In general, two or more transmission rates are used as transmission rates equal to and higher than the present transmission rate. In the case of FIG. 17A, the present transmission rate is 36 Mbps, and three transmission rates, such as 36 Mbps, 48 Mbps and 54 Mbps, are utilized. At each of these transmission rates, a data frame is burst-transmitted to the destination apparatus. After finishing burst transmission at those transmission rates (step S65), a Block Ack Request frame is transmitted to the destination apparatus (step S66), and a Block Ack frame returned from the destination apparatus is received (step S67). Referring to the bitmap field of the Block Ack frame, the MAC controller 14 detects each transmission rate at which the destination apparatus could receive the data frame, and determines as high and reliable a transmission rate as possible, using the method employed in the first embodiment (step S68). After that, the MAC controller 14 informs the modulator 16 of the changed transmission rate (step S69), and the modulator 16 performs setting for transmitting a data frame at this transmission rate.

On the other hand, at steps S70 and S71, burst transmission is started at a transmission rate (or transmission rates) equal to and/or lower than the present transmission rate set before the change request. In general, two or more transmission rates are used as transmission rates equal to and lower than the present transmission rate. In the case of FIG. 17B, the present transmission rate is 36 Mbps, and six transmission rates, such as 36 Mbps, 24 Mbps, 18 Mbps, 12 Mbps, 9 Mbps and 6 Mbps, are utilized. At each of these transmission rates, a data frame is burst-transmitted to the destination apparatus. After finishing burst transmission at those transmission rates (step S65), the program proceeds to the above-mentioned step S66.

Although in the cases of FIGS. 17A and 17B, only one frame is transmitted at the transmission rate increased by one degree, a plurality of frames may be transmitted at the one-degree increased transmission rate in order to more accurately determine the transmission rate. This can eliminate cases where the destination apparatus cannot receive data signals for some reason except for the reason that the transmission rate is too high, thereby enabling determination of a more appropriate transmission rate.

As described above, in the fifth embodiment, when there is a request to change the transmission rate, it is determined whether the request requests to increase or decrease the transmission rate, thereby determining the transmission rate for next burst transmission. As a result, an optimal transmission rate can be determined.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus for transmitting and receiving a plurality of frames to and from another radio communication apparatus, comprising:
a first transmitting unit configured to sequentially burst-transmit a plurality of first frames at a plurality of transmission rates to said another radio communication apparatus so as not to receive, from said another radio communication apparatus when each of the first frames is burst-transmitted, information indicating which frames included in the first frames are received or fail to be received;
a second transmitting unit configured to transmit, to said another radio communication apparatus, an inquiry signal for inquiring which second frames included in the first frames are properly received by said another radio communication apparatus after the first transmitting unit burst-transmits the first frames;
a receiving unit configured to receive, from said another radio communication apparatus, the information which is included ha plurality of received information items corresponding to the second frames; and
a rate setting unit configured to set the first transmitting unit to a transmission rate used for next transmission of third frames to said another radio communication apparatus, based on the information received by the receiving unit.

2. he apparatus according to claim 1, wherein the first transmitting unit sequentially transmits the first frames in order of decreasing transmission rate or in order of increasing transmission rate.

3. The apparatus according to claim 1, further comprising:
a measuring unit configured to measure a received-signal quality based on a frame received from said another radio communication apparatus; and
a determining unit configured to determine a temporary transmission rate used for transmitting frames to said another radio communication apparatus, based on the received-signal quality, the temporary transmission rate being included in the transmission rates,
wherein the first transmitting unit sequentially burst-transmits the first frames at least one of the temporary transmission rate and a near transmission rate which is included in a range near the temporary transmission rate.

4. A radio communication apparatus for transmitting and receiving a plurality of frames to and from another radio communication apparatus, comprising:
a first transmitting unit configured to sequentially burst-transmit a plurality of first frames at a first transmission rate to said another radio communication apparatus so as not to receive, from said another radio communication apparatus when each of the first frames is burst-transmitted, information indicating which frames included in the first frames are received or fail to be received;
a second transmitting unit configured to transmit, to said another radio communication apparatus, an inquiry signal for inquiring which second frames included in the first frames are properly received by said another radio communication apparatus after the first transmitting unit burst-transmits the first frames;
a receiving unit configured to receive, from said another radio communication apparatus, the information which is included ha plurality of received information items corresponding to the second frames; and
a rate setting unit configured to set the first transmitting unit to a second transmission rate used for next transmission of third frames to said another radio communication apparatus, based on the information received by the receiving unit, the second transmission rate being acquired by increasing the first transmission rate if a number of the third frames received by said another radio communication apparatus is not lower than a first ratio, the second transmission rate being acquired by decreasing the first transmission rate if the number of the third frames received by said another radio communication apparatus is not higher than a second ratio.

5. The apparatus according to claim 4, wherein the first ratio is higher than the second ratio.

6. The apparatus according to claim 4, wherein the first transmitting unit sequentially burst-transmits in a first burst amount less than a second burst amount during burst-transmission at the first transmission rate if the rate setting unit sets the first transmitting unit to the second transmission rate.

7. The apparatus according to claim 4, wherein:
if the rate setting unit increases the first transmission rate, the first transmitting unit transmits, in next transmission, a plurality of frames at the transmission rates which are not lower than the first transmission rate; and
if the rate setting unit decreases the first transmission rate, the first transmitting unit transmits, in next transmission, a plurality of frames at the transmission rates which are not higher than the first transmission rate.

8. A radio communication apparatus for transmitting and receiving a plurality of frames to and from another radio communication apparatus, comprising:
- a first transmitting unit configured to sequentially burst-transmit a plurality of first frames at a plurality of transmission rates to said another radio communication apparatus, the transmission rates including a first transmission rate and a second transmission rate higher than the first transmission rate, so as not to receive, from said another radio communication apparatus when each of the first frames is burst-transmitted, information indicating whether frames included in the first frames and transmitted at the second transmission rate are received or fail to be received;
- a second transmitting unit configured to transmit, to said another radio communication apparatus, an inquiry signal for inquiring whether second frames included in the first frames and transmitted at the second transmission rate are properly received by said another radio communication apparatus after the first transmitting unit burst-transmits the first frames;
- a receiving unit configured to receive, from said another radio communication apparatus, the information which is included ma plurality of received information items corresponding to the second frames; and
- a rate setting unit configured to set the first transmitting unit to the second transmission rate, if the information indicates that the-frames included in the first frames and transmitted at the second transmission rate are received, and to set the first transmitting unit to the first transmission rate if the information indicates that the-frames included in the first frames and transmitted at the second transmission rate fail to be received.

9. A radio communication apparatus for transmitting and receiving a plurality of frames to and from another radio communication apparatus, comprising:
- a first transmitting unit configured to sequentially burst-transmit a plurality of first frames at a plurality of transmission rates to said another radio communication apparatus, the transmission rates including a first transmission rate and different transmission rates higher than the first transmission rate, so as not to receive, from said another radio communication apparatus when each of the first frames is burst-transmitted, information indicating whether each of the frames included in the first frames and transmitted at the different transmission rates is received or fails to be received;
- a second transmitting unit configured to transmit, to said another radio communication apparatus, an inquiry signal for inquiring whether each of second frames included in the first frames and transmitted at the different transmission rates is properly received by said another radio communication apparatus after the first transmitting unit burst-transmits the first frames;
- a receiving unit configured to receive, from said another radio communication apparatus, the information which is included in a plurality of received information items corresponding to the second frames; and
- a rate setting unit configured to set the first transmitting unit to a second transmission rate used for next transmission of third frames to said another radio communication apparatus, based on the information received by the receiving unit.

10. A radio communication apparatus for transmitting and receiving a plurality of frames to and from another radio communication apparatus, comprising:
- a first transmitting unit configured to sequentially burst-transmit a plurality of first frames at a plurality of transmission rates to said another radio communication apparatus, the transmission rates including a first transmission rate and different transmission rates lower than the first transmission rate, so as not to receive, from said another radio communication apparatus when each of the first frames is burst-transmitted, information indicating whether each of frames included in the first frames and transmitted at the different transmission rates is received or fails to be received;
- a second transmitting unit configured to transmit, to said another radio communication apparatus, an inquiry signal for inquiring whether each of second frames included in the first frames and transmitted at the different transmission rates is properly received by said another radio communication apparatus after the first transmitting unit burst- transmits the first frames;
- a receiving unit configured to receive, from said another radio communication apparatus, the information which is included ma plurality of received information items corresponding to the second frames; and
- a rate setting unit configured to set the first transmitting unit to a second transmission rate used for next transmission of third frames to said another radio communication apparatus, based on the information received by the receiving unit.

11. A radio communication method, used in a radio communication apparatus, for transmitting and receiving a plurality of frames to and from another radio communication apparatus, comprising:
- sequentially burst-transmitting a plurality of first frames at a plurality of transmission rates to said another radio communication apparatus so as not to receive, from said another radio communication apparatus when each of the first frames is burst-transmitted, information indicating which frames included in the first frames are received or fail to be received;
- transmitting, to said another radio communication apparatus, an inquiry signal for inquiring which second frames included in the first frames are properly received by said another radio communication apparatus after the first frames are burst-transmitted;
- receiving, from said another radio communication apparatus, the information which is included in a plurality of received information items corresponding to the second frames; and setting each of the transmission rates to a transmission rate used for next transmission of third frames to said another radio communication apparatus, based on the received information.

12. A radio communication method, used in a radio communication apparatus, for transmitting and receiving a plurality of frames to and from another radio communication apparatus, comprising:
- sequentially burst-transmitting a plurality of first frames at a first transmission rate to said another radio communication apparatus so as not to receive, from said another radio communication apparatus when each of the first frames is burst-transmitted, information indicating which frames included in the first frames are received or fail to be received;
- transmitting, to said another radio communication apparatus, an inquiry signal for inquiring which second frames included in the first frames are properly received by said another radio communication apparatus after the first frames are burst-transmitted;

receiving, from said another radio communication apparatus, the information which is included in a plurality of received information items corresponding to the second frames; and setting a transmission rate for transmitting the frames to a second transmission rate used for next transmission of third frames to said another radio communication apparatus, based on the received information, the second transmission rate being acquired by increasing the first transmission rate if a number of the third frames received by said another radio communication apparatus is not lower than a first ratio, the second transmission rate being acquired by decreasing the first transmission rate if the number of the third frames received by said another radio communication apparatus is not higher than a second ratio.

13. A radio communication method, used in a radio communication apparatus, for transmitting and receiving a plurality of frames to and from another radio communication apparatus, comprising:

sequentially burst-transmitting a plurality of first frames at a plurality of transmission rates to said another radio communication apparatus, the transmission rates including a first transmission rate and a second transmission rate higher than the first transmission rate, so as not to receive, from said another radio communication apparatus when each of the first frames is burst-transmitted, information indicating whether frames included in the first frames and transmitted at the second transmission rate are received or fail to be received;

transmitting, to said another radio communication apparatus, an inquiry signal for inquiring whether second frames included in the first frames and transmitted at the second transmission rate are properly received by said another radio communication apparatus after the first frames are burst-transmitted;

receiving, from said another radio communication apparatus, the information which is included in a plurality of received information items corresponding to the second frames; and setting a transmission rate for transmitting the frames to the second transmission rate, if the information indicates that the-frames included in the first frames and transmitted at the second transmission rate are received, setting the transmission rate to the first transmission rate if the information indicates that frames included in the first frames and transmitted at the second transmission rate fail to be received.

14. A radio communication method, used in a radio communication apparatus, for transmitting and receiving a plurality of frames to and from another radio communication apparatus, comprising:

sequentially burst-transmitting a plurality of first frames at a plurality of transmission rates to said another radio communication apparatus, the transmission rates including a first transmission rate and different transmission rates higher than the first transmission rate, so as not to receive, from said another radio communication apparatus when each of the first frames is burst-transmitted, information indicating whether each of frames included in the first frames and transmitted at the different transmission rates is received or fails to be received;

transmitting, to said another radio communication apparatus, an inquiry signal for inquiring whether each of second frames included in the first frames and transmitted at the different transmission rates is properly received by said another radio communication apparatus after the first frames are burst-transmitted;

receiving, from said another radio communication apparatus, the information which is included in a plurality of received information items corresponding to the second frames; and setting a transmission rate for transmitting the frames to a second transmission rate used for next transmission of third frames to said another radio communication apparatus, based on the received information.

15. A radio communication method, used in a radio communication apparatus, for transmitting and receiving a plurality of frames to and from another radio communication apparatus, comprising:

sequentially burst-transmitting a plurality of first frames at a plurality of transmission rates to said another radio communication apparatus, the transmission rates including a first transmission rate and different transmission rates lower than the first transmission rate, so as not to receive, from said another radio communication apparatus when each of the first frames is burst-transmitted, information indicating whether each of frames included in the first frames and transmitted at the different transmission rates is received or fails to be received;

transmitting, to said another radio communication apparatus, an inquiry signal for inquiring whether each of second frames included in the first frames and transmitted at the different transmission rates is properly received by said another radio communication apparatus after the first frames are burst-transmitted;

receiving, from said another radio communication apparatus, the information which is included in a plurality of received information items corresponding to the second frames; and setting a transmission rate for transmitting the frames to a second transmission rate used for next transmission of third frames to said another radio communication apparatus, based on the received information.

16. A computer-readable medium including computer executable instructions, wherein the instructions, when executed by a processor, cause the processor to perform a method, used in a radio communication apparatus, for transmitting and receiving a plurality of frames to and from another radio communication apparatus, comprising:

sequentially burst-transmitting a plurality of first frames at a plurality of transmission rates to said another radio communication apparatus so as not to receive, from said another radio communication apparatus when each of the first frames is burst-transmitted, information indicating which frames included in the first frames are received or fail to be received;

transmitting, to said another radio communication apparatus, an inquiry signal for inquiring which second frames included in the first frames are properly received by said another radio communication apparatus after the first frames are burst-transmitted;

receiving, from said another radio communication apparatus, the information which is included in a plurality of received information items corresponding to the second frames; and setting each of the transmission rates to a transmission rate used for next transmission of third frames to said another radio communication apparatus, based on the received information.

17. A computer-readable medium including computer executable instructions, wherein the instructions, when executed by a processor, cause the processor to perform a method, used in a radio communication apparatus, for transmitting and receiving a plurality of frames to and from another radio communication apparatus, comprising:

sequentially burst-transmitting a plurality of first frames at a first transmission rate to said another radio communication apparatus so as not to receive, from said another radio communication apparatus when each of the first frames is burst-transmitted, information indicating which frames included in the first frames are received or fail to be received;

transmitting, to said another radio communication apparatus, an inquiry signal for inquiring which second frames included in the first frames are properly received by said another radio communication apparatus after the first frames are burst-transmitted;

receiving, from said another radio communication apparatus, the information which is included in a plurality of received information items corresponding to the second frames; and setting a transmission rate for transmitting the frames to a second transmission rate used for next transmission of third frames to said another radio communication apparatus, based on the received information, the second transmission rate being acquired by increasing the certain transmission rate if a number of the third frames received by said another radio communication apparatus is not lower than a first ratio, the second transmission rate being acquired by decreasing the first transmission rate if the number of the third frames received by said another radio communication apparatus is not higher than a second ratio.

18. A computer-readable medium including computer executable instructions, wherein the instructions, when executed by a processor, cause the processor to perform a method, used in a radio communication apparatus, for transmitting and receiving a plurality of frames to and from another radio communication apparatus, comprising:

sequentially burst-transmitting a plurality of first frames at a plurality of transmission rates to said another radio communication apparatus, the transmission rates including a first transmission rate and a second transmission rate higher than the first transmission rate, so as not to receive, from said another radio communication apparatus when each of the first frames is burst-transmitted, information indicating whether the-frames included in the first frames and transmitted at the second transmission rate are received or fail to be received;

transmitting, to said another radio communication apparatus, an inquiry signal for inquiring whether second frames included in the first frames and transmitted at the second transmission rate are properly received by said another radio communication apparatus after the first frames are burst-transmitted;

receiving, from said another radio communication apparatus, the information which is included in a plurality of received information items corresponding to the second frames; and setting a transmission rate for transmitting the frames to the second transmission rate, if the information indicates that frames included in the first frames and transmitted at the second transmission rate are received, and set the transmission rate to the first transmission rate if the information indicates that the-frames included in the first frames and transmitted at the second transmission rate fail to be received.

19. A computer-readable medium including computer executable instructions, wherein the instructions, when executed by a processor, cause the processor to perform a method, used in a radio communication apparatus, for transmitting and receiving a plurality of frames to and from another radio communication apparatus, comprising:

sequentially burst-transmitting a plurality of first frames at a plurality of transmission rates to said another radio communication apparatus, the transmission rates including a first transmission rate and different transmission rates higher than the first transmission rate, so as not to receive, from said another radio communication apparatus when each of the first frames is burst-transmitted, information indicating whether each of frames included in the first frames and transmitted at the different transmission rates is received or fails to be received;

transmitting, to said another radio communication apparatus, an inquiry signal for inquiring whether each of second frames included in the first frames and transmitted at the different transmission rates is properly received by said another radio communication apparatus after the first frames are burst-transmitted;

receiving, from said another radio communication apparatus, the information which is included in a plurality of received information items corresponding to the second frames; and setting a transmission rate for transmitting the frames to a second transmission rate used for next transmission of third frames to said another radio communication apparatus, based on the received information.

20. A computer-readable medium including computer executable instructions, wherein the instructions, when executed by a processor, cause the processor to perform a method, used in a radio communication apparatus, for transmitting and receiving a plurality of frames to and from another radio communication apparatus, comprising:

sequentially burst-transmitting a plurality of first frames at a plurality of transmission rates to said another radio communication apparatus, the transmission rates including a first transmission rate and different transmission rates lower than the first transmission rate, so as not to receive, from said another radio communication apparatus when each of the first frames is burst-transmitted, information indicating whether each of frames included in the first frames and transmitted at the different transmission rates is received or fails to be received;

transmitting, to said another radio communication apparatus, an inquiry signal for inquiring whether each of second frames included in the first frames and transmitted at the different transmission rates is properly received by said another radio communication apparatus after the first frames are burst-transmitted;

receiving, from said another radio communication apparatus, the information which is included in a plurality of received information items corresponding to the second frames; and setting a transmission rate for transmitting the frames to a second transmission rate used for next transmission of third frames to said another radio communication apparatus, based on the received information.

* * * * *